US008065391B2

(12) United States Patent
Olliphant

(10) Patent No.: US 8,065,391 B2
(45) Date of Patent: Nov. 22, 2011

(54) SYSTEM AND METHOD FOR SELECTING AND DISPLAYING WEBPAGES

(76) Inventor: Hugh Olliphant, San Francisco, CA (US)

( * ) Notice: Subject to any disclaimer, the term of this patent is extended or adjusted under 35 U.S.C. 154(b) by 416 days.

(21) Appl. No.: 11/788,457

(22) Filed: Apr. 19, 2007

(65) Prior Publication Data

US 2008/0263135 A1 Oct. 23, 2008

(51) Int. Cl.
*G06F 15/16* (2006.01)
(52) U.S. Cl. .................... 709/218; 709/250
(58) Field of Classification Search .......... 709/218, 709/223, 245
See application file for complete search history.

(56) References Cited

U.S. PATENT DOCUMENTS

| 7,290,204 | B1 * | 10/2007 | Kanno et al. | 715/205 |
| 2002/0035611 | A1 * | 3/2002 | Dooley | 709/218 |
| 2002/0194216 | A1 * | 12/2002 | Kanno et al. | 707/500.1 |
| 2004/0225887 | A1 * | 11/2004 | O'Neil et al. | 713/193 |
| 2008/0222295 | A1 * | 9/2008 | Robinson et al. | 709/227 |

OTHER PUBLICATIONS

Gilbertson, S. ("The Social Bookmarking Showdown: StumbleUpon", Oct. 2006, p. 1-2).*
("Homepage Randomizer", Feb. 2006, pp. 1-4, retrieved from http://ask.metafilter.com/32333/Homepage-Randomizer on May 20, 2009).*
Cookie Monster et al., "Homepage Randomizer", Feb. 8, 2006, http://ask.metafilter.com/32333/Homepage-Randomizer.*
"Netvibes.com Blog," http://web.archive.org/web/20070116102449/blog.netvibes.com, Jan. 2007, pp. 7.
"Stumble Upon Help," http://web.archive.org/web/20040718051209/www.stumbleupon.com, Jul. 2004, pp. 3.
"Pageflakes—The whole Web at your Fingertips!," http://web.archive.org/web/20070123203339/http://pageflakes.com, Jan. 2007, pp. 2.
"About Stumble Upon," http://web.archive.org/web/20040711002049/www.stumbleupon.com, Jul. 2004, pp. 3.
"Welcome to My Yahoo," http://web.archive.org/web/20040701022259/my.yahoo.com/p/d.html?v, Jul. 2007, pp. 4.
"Yahoo! My Yahoo! Tour Wizard," http://wizards.yahoo.com/members/tools/publishing/wizards/server/, Printed Dec. 28, 2009, pp. 4.
"I'm testing a piece of / Stealthmode Blog," http://blog.stealthmode.com/2003/im-testing-a-piece-of/, Mar. 2003, pp. 5.
Penelope Patsuris, "Is eTour worth the trip?," Oct. 15, 1999, pp. 4.
"Is eTour worth the trip?," Oct. 15, 1999, http://www.forbes.com/1999/0/15/feat2_print.html, pp. 2.

* cited by examiner

*Primary Examiner* — Jude Jean Gilles
*Assistant Examiner* — Jaren Means
(74) *Attorney, Agent, or Firm* — Morgan, Lewis & Bockius LLP

(57) ABSTRACT

A computer-implemented method of dynamically selecting and presenting a webpage includes: receiving a request, at a server, from a client device to display a webpage; determining, at the server, a homepage defined by a user of the client device; accessing, at the server, a list of one or more webpages associated with the user; selecting a chosen webpage from the homepage and the list of one or more webpages; and facilitating the display of the chosen webpage on the client device.

36 Claims, 36 Drawing Sheets

```
<script language="JavaScript">
// Copyright (c) 2007 Site Safari Inc

// Special message to users concerned about their privacy:
// The following code illustrates the information we collect and
// pass back to our servers.  We collect information on the
// number of times you have viewed a given URL as well as
// recording the timestamp of your last visit to that site.
// This is ONLY for the URLs that you've added to your Site Safari
// homepage rotation -- nothing that you surf outside of that is captured by us.
// This information is used to help us gauge which sites
// are popular and which are flops, which we use in turn to
// given our users a better quality experience.

function Cookie(document, name, hours, path, domain, secure) {
  this.$document = document;
  this.$name = name;
  if (hours)
    this.$expiration = new Date((new Date()).getTime( ) + hours*3600000);
  else this.$expiration = null;
  if (path) this.$path = path; else this.$path = null;
  if (domain) this.$domain = domain; else this.$domain = null;
  if (secure) this.$secure = true; else this.$secure = false;
 }

Cookie.prototype.store = function ( ) {
 var cookieval = "";
 for(var prop in this) {
         tProp = prop + 't';
    if ((tProp.charAt(0) == '$') || ((typeof this[prop]) == 'function'))
      continue;
    if (cookieval != "") cookieval += '&';
    cookieval += prop + ':' + escape(this[prop]);
 }
 var cookie = this.$name + '=' + cookieval;
 if (this.$expiration)
   cookie += '; expires=' + this.$expiration.toGMTString( );
 if (this.$path) cookie += '; path=' + this.$path;
 if (this.$domain) cookie += '; domain=' + this.$domain;
 if (this.$secure) cookie += '; secure';
 this.$document.cookie = cookie;
 }
```

Figure 9A

```
Cookie.prototype.load = function( ) {
 var allcookies = this.$document.cookie;
 if (allcookies == "") return false;
 var start = allcookies.indexOf(this.$name + '=');
 if (start == -1) return false;   // Cookie not defined for this page
 start += this.$name.length + 1;  // Skip name and equals sign
 var end = allcookies.indexOf(';', start);
 if (end == -1) end = allcookies.length;
 var cookieval = allcookies.substring(start, end);
 var a = cookieval.split('&');   // Break it into an array of name/value
pairs
 if (cookieval.length > 0 && a[0].indexOf(':')==-1) {    // For simple
values, use <cookie name>.value
   this.value=a[0];
   return true;
 }
 for(var i=0; i < a.length; i++)  // Break each pair into an array
  a[i] = a[i].split(':');
 for(var i = 0; i < a.length; i++)
  this[a[i][0]] = unescape(a[i][1]);
 return true;
}

Cookie.prototype.remove = function( ) {
 var cookie;
 cookie = this.$name + '=';
 if (this.$path) cookie += '; path=' + this.$path;
 if (this.$domain) cookie += '; domain=' + this.$domain;
 cookie += '; expires=Fri, 02-Jan-1970 00:00:00 GMT';
 this.$document.cookie = cookie;
} function InitUrLst() {
 SelUrs();
 SetUrs();
} function SelUrs() {
 UrLst.length = 0;
 var SUpos = 0;
 var lagcnt = new Array();
 var dontdelete = '2x134158v2ac';
 var EHGrpID;
 for (i=0; i<UUrlD.length; i++) {
  if (!GFtPrnt[UGrpID[i]]) {
   UrLst[SUpos++] = i; }
  else {
   if (EHGrpID != UGrpID[i]) {
        okUrs = EschewHist(UGrpID[i]);
        EHGrpID = UGrpID[i];
      }
      for (j=0; j < okUrs.length; j++) {
        if (okUrs[j] == i) {
   if(!lagcnt[UGrpID[i]]) {
    lagcnt[UGrpID[i]] = 1;
    UrLst[SUpos++] = i;
   }
   else if (lagcnt[UGrpID[i]] < GFtPrnt[UGrpID[i]]) {
    lagcnt[UGrpID[i]]++;
    UrLst[SUpos++] = i;
   }
```

Figure 9B

```
function EschewHist(GrpID) {
 var okUrs = new Array();
 while (okUrs.length < GFtPrnt[GrpID]) {
  mincnt = Number.POSITIVE_INFINITY;
  var i = 0;
  var bUr = -1;
  while (i < UGrpID.length) {
   if (UGrpID[i] == GrpID) {
    var cnt = 0;
    for (j=0; j < H_Ps.HistLen; j++) { if (H_Hist[j]
== i) cnt++; }
         for (j=0; j < UrLst.length; j++) { if
(UrLst[j] == i) cnt++; }
         for (j=0; j < okUrs.length; j++) { if
(okUrs[j] == i) cnt++; }
         if (cnt < mincnt) {
          mincnt = cnt;
          bUr = i;
         }
        }
   i++;
  }
  if (bUr > -1) okUrs[okUrs.length] = bUr;
 }
 return okUrs;
} function SetUrs() {
 var tUrLst = new Array();
 var pos = 0;
 for (i=0; i<UrLst.length; i++) {
  for (j=1; j<=(URel[UrLst[i]]^2.01); j++) {
   tUrLst[pos++] = UrLst[i]; }
 }
 UrLst.length = 0;
 UrLst = tUrLst;
} function Promote(arr, prom, before) {
 var bUr = arr[prom];
 for (var i=prom; i>=before; i--) arr[i] = arr[i-1];
 arr[before] = bUr;
 return arr
}
```

Figure 9C

```
function next() { if (UUrID.length==0) {
   window.location = 'http://sitesafari.com/';
   return; }
  H_Ps.HistPos++;
  H_Ps.store();
  var nwLoc = SelUrl();
  document.getElementById('redirURL').innerHTML =
UUr[H_Hist[H_Ps.HistPos]];
  document.getElementById('redirGrpNm').innerHTML =
GrpNms[UGrpID[H_Hist[H_Ps.HistPos]]];
  window.location = nwLoc;
 } function SelUrl() {
  var Upos = SelTOD();
  var d    = new Date();
  var LastFewMins = ((d.getTime()/1000)-(5*60));
  if (Upos==-1 && USrc[0]=="4" &&
window.location.href.indexOf('bored=1')==-1 &&
     (H_Vstd[UUrID[0]]==undefined || H_Vstd[UUrID[0]] <
LastFewMins)) {
   var useHP = Math.floor(Math.random()*10)+1;
   if (useHP >= URel[0]) Upos = 0;
  }
  if (Upos == -1) {
   Upos=Math.floor(Math.random()*UrLst.length);
   Upos = UrLst[Upos];
   RndRmv(Upos);
  }
  H_Hist[H_Ps.HistPos] = Upos;
  H_Ps.HistLen = H_Ps.HistPos + 1;
  H_Hist.store(); H_Ps.store();
  UpdCooks(H_Ps.HistPos);
  return formatURL(UUr[H_Hist[H_Ps.HistPos]]);
 }
```

Figure 9D

```
function SelTOD() {
 var Now = new Date();

for (var i=0; i< UHr.length; i++) {
  if (UHr[i] == '') continue;
  var StartTime = new
Date(Now.getYear(),Now.getMonth(),Now.getDate(),UHr[i],UMnt[
i],0);
  if (StartTime > Now) {
   StartTime = DateAdd(StartTime,-24); }
  var EndTime   = DateAdd(StartTime, UDur[i]);

if (StartTime <= Now && Now <= EndTime) {
   var Seen = false;
   if (H_Vstd[UUrID[i]]) {
    var tVstd = new Date((H_Vstd[UUrID[i]]*1000));
    if (StartTime <= tVstd && tVstd <= EndTime) {
       Seen = true; }
       }
       if (Seen == false) {
       return i; }
  }
 }
 return -1;
} function UpdCooks(pos) {
 if (!H_Hits[UUrID[H_Hist[pos]]]) H_Hits[UUrID[H_Hist[pos]]] = 1;
 else H_Hits[UUrID[H_Hist[pos]]]++;
 H_Hits.store();
 now = new Date();
 H_Vstd[UUrID[H_Hist[pos]]] = Math.floor(now.getTime() /
1000);
 H_Vstd.store();
}
function formatURL(URL) {
 if (URL.substr(0,7).indexOf(":") == -1) {
  URL = "http://" + URL; }
 return URL;
}
```

Figure 9E

```
function RndRmv(rmval) {
 i = 0;
 while (i < UrLst.length) {
  if (UrLst[i] == rmval) {
   for (var j=i; j<(UrLst.length-1); j++) UrLst[j]
= UrLst[j+1];
   UrLst.length--;
  }
  else i++;
 }
 if (UrLst.length == 0) {
  SelUrs();
  SetUrs();
 }
} function DateAdd(d, hrs) {
  var dM    = d.getTime();
  var currM = dM + (3600000 * hrs);
  var currD = new Date(currM);
  return currD;
} function delCookVals(ck) {
  ck.load();
  for (var prop in ck)
   if (prop.substr(0,1) != '$' &&
      prop != 'load' &&
         prop != 'store' &&
         prop != 'remove')
        delete H_Hist[prop];
  ck.store();
} var rld = new Cookie(document, "reload",
8760, "/homepage/");
rld.load();
if (rld.value) {
 rld.remove();
 window.location.reload(true);
}
```

Figure 9F

```
var ThisUpd = "27010741221223107";
var UrLst = new Array();
var H_Hits  = new Cookie(document, "H_Hits", 8760, "/");
var H_Vstd  = new Cookie(document, "H_Vstd", 8760, "/");
var H_Hist  = new Cookie(document, "H_Hist", 8760, "/");
var H_Ps    = new Cookie(document, "H_Ps", 8760, "/");
H_Ps.load();

if(H_Ps.LastUpd == ThisUpd) {
 H_Hits.load();
 H_Vstd.load();
 H_Hist.load();}
else {
 H_Ps.LastUpd = ThisUpd;
 H_Ps.HistPos = -1;
 H_Ps.HistLen = 0;
 H_Ps.store();
 delCookVals(H_Hist);
 delCookVals(H_Hits);
 delCookVals(H_Vstd);
}
InitUrLst();

</script>

</head>

<body  onload='next();' leftmargin='0' rightmargin='0'
    topmargin='0' marginheight='0' marginwidth='0'>
<table align=center width=800>
 <tr>
  <td><a href=./><img src=../img/sitesafari.com-logo.gif border=0></a></td></
tr></table><br>

<table align=center>
 <tr>
  <td>Redirecting to:</td>
  <td id=redirURL></td></tr>
 <tr>
  <td>From group:</td>
  <td id=redirGrpNm></td></tr>
 <tr>
  <td colspan=2> <br>
  If you are not automatically redirected, please <a
href="javascript:next();">click here</a>.<br>
  If you ever need to adjust your settings, go to <a href=http://
sitesafari.com>http://sitesafari.com</a>.</td></tr>
 <tr>
  <td> </td></tr>
 <tr>
  <td>
  </td></tr></table>
 </body>
</html>
```

Figure 9G

SYSTEM AND METHOD FOR SELECTING AND DISPLAYING WEBPAGES

TECHNICAL FIELD

The disclosed embodiments relate generally to the display of webpages, and in particular, to a system and method for dynamically selecting and displaying webpages upon a user-initiated action and in accordance with user preferences and interests.

BACKGROUND

These days, there is an abundance of information available on the World Wide Web (hereinafter "Web"). However, if a user does not know about a website or that certain information may be available on the Web, the user may not be able to access that website or be presented with information that they may be interested in. The terms website and webpage are used interchangeably throughout this document.

Additionally, since the advent of the Web, web browsers (hereinafter "browser") such as NETSCAPE or INTERNET EXPLORER have presented users with a default page that loads when the browser is first launched. Most browsers, however, allow users to change their default homepage. If users change their homepage at all, they typically set their homepage either to a search engine, such as google.com, or to a content portal, such as yahoo.com or msn.com. Search engine homepages, however, often have static content, i.e. the user is presented with the same homepage each time the browser is launched, while content portals provide overly generalized content that is selected by the content provider. Accordingly, being presented with the same homepage each time that the user launches their browser does not expose the user to a variety of websites that they may otherwise be interested in viewing.

In recent years, services have emerged that allow users to personalize their homepage. These services, such as MY YAHOO and NETVIBES, aggregate content from a wide variety of sources and present this content in a modular fashion within a personalized homepage. While these personalized homepages present dynamic content, they do not present dynamic user experiences, as the content may change but the format and website remain the same. For example, while users can view the latest news feeds, blogs, weather, and other items, but does not experience new websites or content as its publisher intended.

Furthermore, even the earliest browsers had the ability to store a user's favorite links, called favorites or bookmarks. A major expansion on this has been the advent of bookmarking websites such as DEL.ICIO.US and FURL. These services began as ways for users to store their bookmarks with an online service so that those bookmarks could be accessed from any computer. This model quickly involved into what has become known as social bookmarking, which allows users to easily share bookmarks with one another. Typically a user can browse another user's bookmarks either by invitation or by public access, and if the user likes the description of a link, the user can select that link to view a webpage associated with the link. Similarly, users can access their own bookmarks stored on the online service. However, there are many situations where it would be desirable to have a simplified and streamlined process for accessing either one's own bookmarks or the shared bookmarks of others. For example, if a user would like to access a random link within her company's collection of "competitor companies" bookmarks, there currently isn't an easy way to do so. Alternatively, a user might want to simply select an icon or button to access the next sequential web page within a set of bookmarks.

As such, it would be highly desirable to address the above drawbacks while providing a more dynamic and personalized experience for Internet users.

SUMMARY

In some embodiments, the present system allows users to set their web browser to display a different webpage each time the user launches their browser. Other embodiments allow users to set their browser to display a different webpage upon some other user-initiated action, such as selecting a toolbar button or desktop icon. Unlike customized or personalized webpages or homepages, described above, the system displays a different website or webpage at each user-initiated action, rather than merely changing the content within the same webpage. The displayed website is automatically chosen and displayed (i.e., without human interaction) based on user-selected preferences. These preferences may be based on how often the user wants to see a currently defined homepage, websites associated with the user's interests, the user's bookmarks, bookmarks of other individuals or groups, or the like. The user may establish a profile and input their preferences through a standard web interface, e.g., a website viewed in a standard browser.

In some embodiments, the present system allows a user to set how often they want to see their currently defined homepage each time they launch their web browser, where their currently defined homepage is the default website that prior to defining the user's preferences appeared each time that the user launched their browser. In use, this system displays the user's homepage as often as the user's preferences dictate while also displaying other websites in accordance with the remainder of the user's preferences. Based on the user's preferences, these other webpages may be selected randomly or sequentially from the user's bookmarks, categories of shared bookmarks, categories of interests, websites or webpages that are highly rated web communities (e.g., digg.com), etc.

In accordance with some embodiments, once the user sets their browser's homepage to point to the dynamic webpage server of the present invention, the server selects one or more webpages based on the user-selected preferences stored at the dynamic webpage server, and the user's browser is then re-directed to the chosen website each user-initiated action, e.g., each time that the user opens a new browser window, or selects a toolbar button or desktop icon. In browsers that supports multiple tabs (i.e. INTERNET EXPLORER 7.0 and MOZILLA FIREFOX), the present system may dynamically select which pages are displayed across multiple tabs.

Another embodiment of the invention is directed at users who regularly visit the same series of websites each day. With each user-initiated action, the displayed website is advanced to the next webpage in the series of websites that the user views each day. For example, a person could select a toolbar button to open and display a site featuring stock prices for stocks they hold; then, the user could select the same toolbar button to advance to a website about their favorite sports team; etc. The system may also dynamically learn and simulate a user's pattern of behavior. For example, the series of websites that the user views each day can be automatically determined by the system and stored in the users profile for later use, as described above.

In an alternative embodiment, the system may automatically display a user's bookmarks, if any, according to the user's preferences and according to certain predefined criteria. For example, the user may perform some user-initiated action by selecting a toolbar icon or desktop icon, and the system may display one of the webpages associated with on of the bookmarks of the user. Then, the system may automatically display another webpage associated with another bookmark according to a predefined criteria. In some embodiments, the predefined criteria may be a certain amount of time. In some other embodiments, the user may select the order in which to display the webpages associated with his/her bookmarks.

In accordance with other embodiments, the system can take into account the current time/date, e.g., time, day, date, year, etc., in determining what pages to display to the user. For example, a user can set their webpage preferences to display websites about competitors and partners during the work day, but have sports or personal interests appear during lunchtime, and humorous websites displayed in the evening. Similarly, the system may display webpages related to jewelry, consumer electronics, or hardware around the date of certain anniversaries, a spouse's birthday, or the holiday season.

No matter which embodiment, the system functions by enabling a user to set link categories according to their preferences and interests, where a link category is a list of one or more links to webpages or websites, e.g. URLs (Uniform Resource Locators). These groups of links may be specific to a particular user or grouped together, such as into a link category that includes links to websites associated with a particular subject matter or topic, e.g., technology, pets, world news, etc. Links can also be shared between users.

In use, the user first creates an account within the dynamic webpage system and provides certain basic user information. Such basic user information may include a username, a password, and an email address. This information is unique for each user and is stored in a user profile unique to that user. The user may also input preferences that dictate which pages will be included in the group of webpages from which a "new" homepage is selected with each user-initiated action, such as each time the user opens their browser.

These preferences may include the current homepage associated with the user's web browser. Normally, this homepage was displayed when the user launched his/her browser. Alternatively, an application on the user's computing device, such as a JAVA plugin, may automatically determine the user's homepage without the user having to provide it. The system may also allow the user to select how often they would like the current homepage to be displayed each user-initiated action, e.g., each time the browser is launched. For example, the user selects the current homepage to display every tenth time a browser instance is opened.

Furthermore, the user preferences may also include user interests. For example, some topics may include popular videos, news items, humor, music, physics, astronomy, dogs, cats, photography, literature, poetry, podcasts, health, gaming, cooking, or the like. The system may then select from among websites associated with the user-selected interests. Additionally, the user may indicate, not only their interests, but also how often they want a website associated with their interests to be displayed. Additionally, user preferences may also include the bookmarks associated with the user's browser. The system also allows users to share bookmarks with each other.

In accordance with some embodiments of the present invention, a computer-implemented method of dynamically selecting and presenting a webpage includes: receiving a request, at a server, from a client device to display a webpage; determining, at the server, a homepage defined by a user of the client device; accessing, at the server, a list of one or more webpages associated with the user; selecting a chosen webpage from the homepage and the list of one or more webpages; and facilitating the display of the chosen webpage on the client device.

In accordance with some embodiments of the present invention, a computer-implemented method of dynamically presenting a webpage includes: receiving a request, at a server, from a client device to display a webpage; determining, at the server, a homepage defined by a user of the client device; accessing a list of one or more bookmarks associated with the user; selecting a chosen webpage from a combination of the homepage and the list of one or more bookmarks; and facilitating the display of the chosen webpage on the client device.

In accordance with some embodiments of the present invention, a system for dynamically selecting and presenting a webpage includes memory, one or more processors, and one or more programs stored in memory and configured for execution by the one or more processors. The one or more programs include: instructions for receiving a request, at a server, from a client device to display a webpage; instructions for determining, at the server, a homepage defined by a user of the client device; instructions for accessing, at the server, a list of one or more webpages associated with the user; instructions for selecting a chosen webpage from the homepage and the list of one or more webpages; and instructions for facilitating the display of the chosen webpage on the client device.

In accordance with some embodiments, computer readable storage medium for use in conjunction with a computer system having a processor includes one or more programs executable by the processor. The one or more programs include: instructions for receiving a request, at a server, from a client device to display a webpage; instructions for determining, at the server, a homepage defined by a user of the client device; instructions for accessing, at the server, a list of one or more webpages associated with the user; instructions for selecting a chosen webpage from the homepage and the list of one or more webpages; and instructions for facilitating the display of the chosen webpage on the client device.

In accordance with some embodiments, a system for dynamically selecting and presenting a webpage includes memory, one or more processors, and one or more programs stored in memory and configured for execution by the one or more processors. The one or more programs include: instructions for receiving a request, at a server, from a client device to display a webpage; instructions for determining, at the server, a homepage defined by a user of the client device; instructions for accessing, at the server, a list of one or more webpages associated with the user; instructions for selecting a chosen webpage from the homepage and the list of one or more webpages; and instructions for facilitating the display of the chosen webpage on the client device.

In accordance with some embodiments, a computer readable storage medium for use in conjunction with a computer system having a processor includes one or more programs executable by the processor. The one or more programs include: instructions for receiving a request, at a server, from a client device to display a webpage; instructions for determining, at the server, a homepage defined by a user of the client device; instructions for accessing, at the server, a list of one or more webpages associated with the user; instructions for selecting a chosen webpage from the homepage and the list of one or more webpages; and instructions for facilitating the display of the chosen webpage on the client device.

BRIEF DESCRIPTION OF THE DRAWINGS

FIGS. 9A-9G illustrates exemplary code of the present system in accordance with some embodiments.

Like reference numerals refer to corresponding parts throughout the drawings.

DETAILED DESCRIPTION OF THE INVENTION

Figure 1:
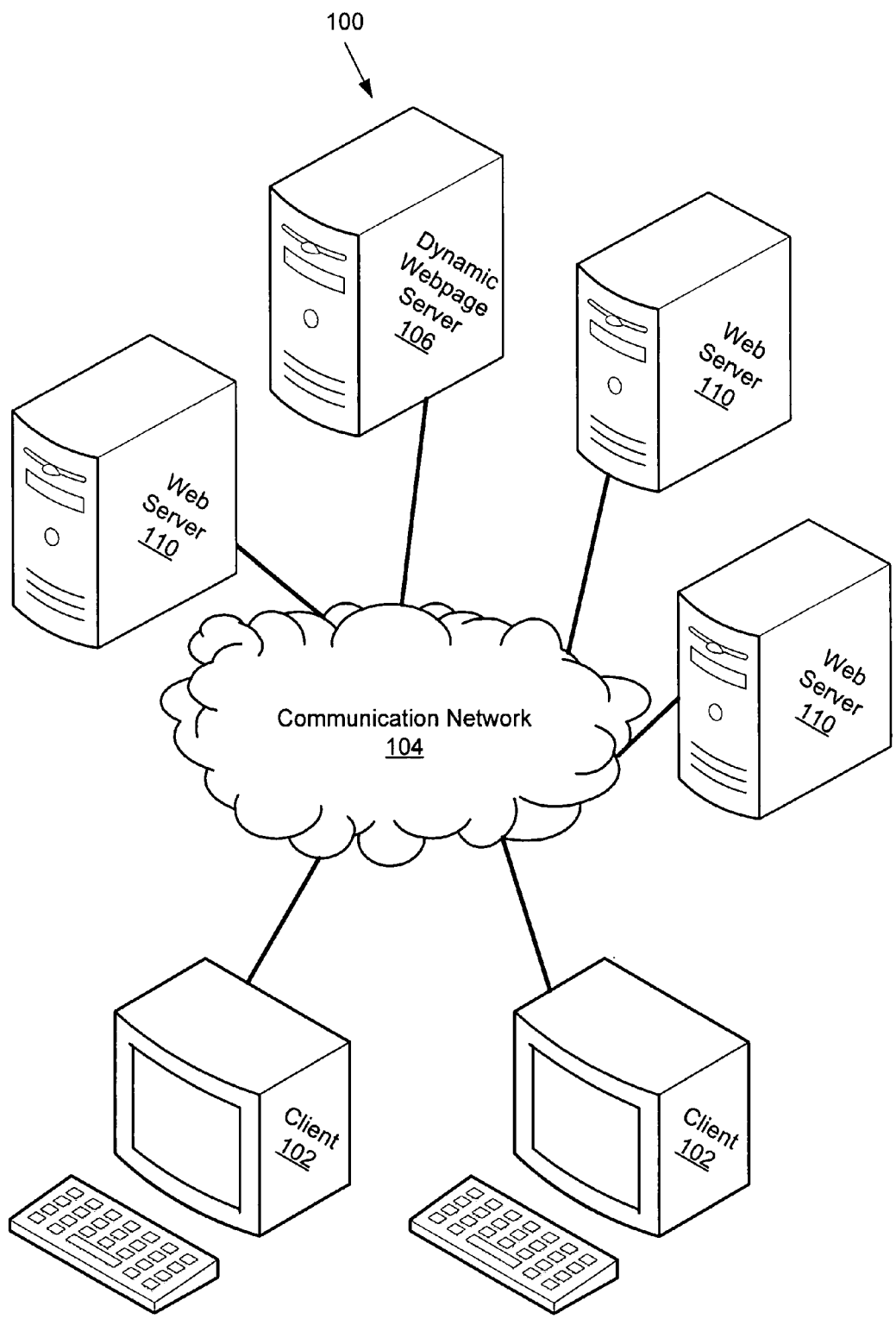
FIG. 1 is a block diagram of a system for dynamically selecting and presenting a webpage in accordance with some embodiments of the present invention.

FIG. 1 is a block diagram of a dynamic webpage system 100 for automatically selecting and displaying a webpage based on user preferences in accordance with some embodiments of the present invention. One or more client computing devices 102 (hereinafter "clients"), a dynamic webpage server 106, and one or more web servers 110 are connected to one another via a communication network 104. The client 102 may be any suitable computing device, such as a desktop or laptop computer, an internet kiosk, a personal digital assistant, a cell phone, or the like.

In some embodiments, the network 104 is the Internet, but may also be a local area network (LAN), a metropolitan area network, another wide area network (WAN), such as an intranet, an extranet, or the Internet, or any combination of such networks. The communication network 104 provides communication capability between the clients 102, the dynamic webpage servers 106 and the web servers 106. In some embodiments, the communication network 104 uses Hyper-Text Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any document, object, information item, set of information, or service that is accessible via a Uniform Resource Locator (URL) and can be, for example, a web page, a text or word processing document, an email message, a transcribed voice message, a database, an image, or a computational object.

Figure 2:
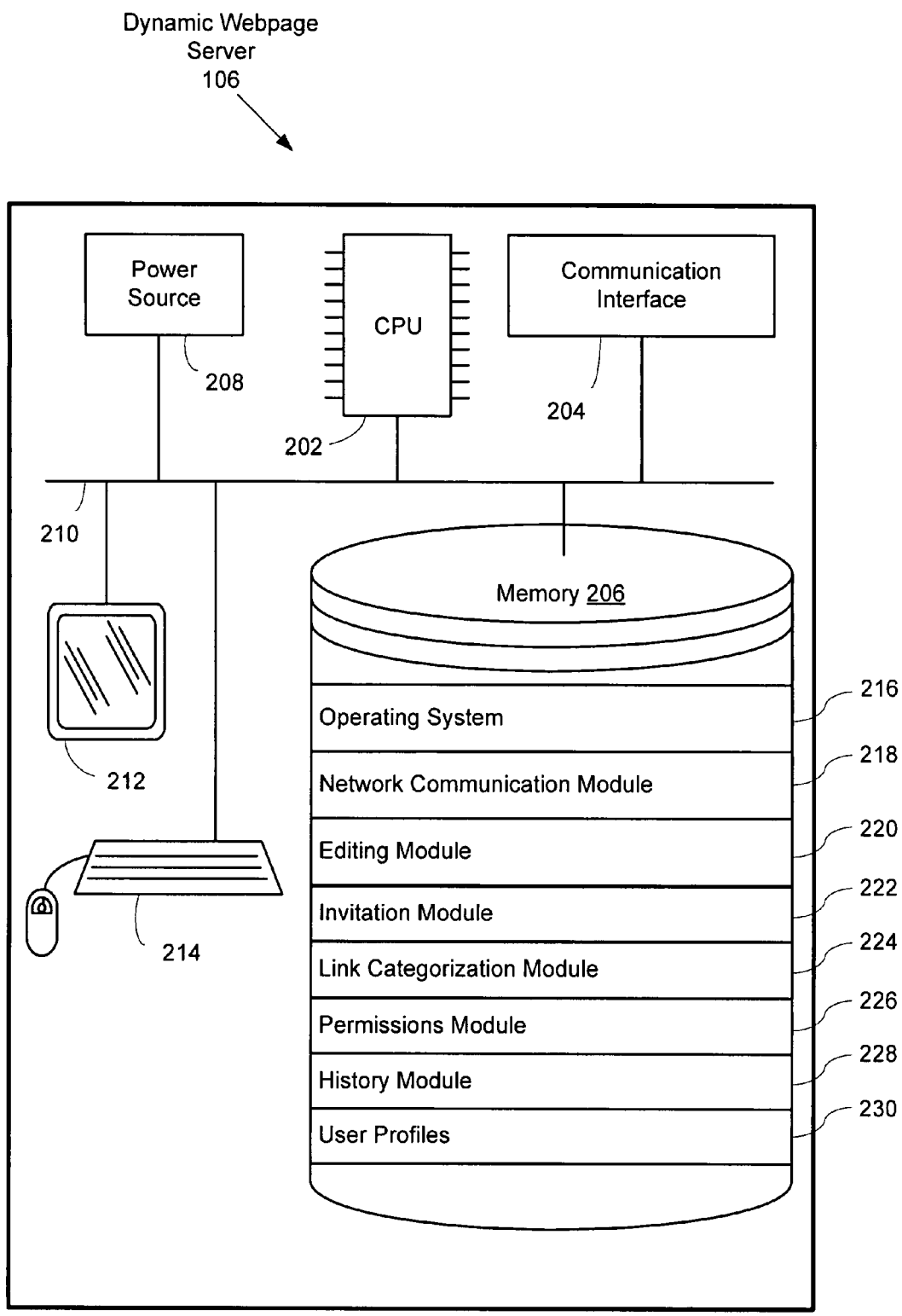
FIG. 2 is a block diagram of an exemplary dynamic webpage server in accordance with some embodiments of the present invention.

FIG. 2 is a block diagram of an exemplary dynamic webpage server 106 of the dynamic paging system 100 of FIG. 1. The dynamic paging system translates a user-initiated action, such as a mouse click or the opening of a browser, into the selection and display of a webpage on a client computer 102 (FIG. 1), where the selection is based on a user's preferences, including the user's preferred link categories. As described above, a link category is list of links, such as a category or grouping of links to websites or webpages. Links can be grouped by combining similar user-defined tags into categories or can be grouped through other methods of grouping common links.

The dynamic webpage server 106 typically includes one or more processing units (CPUs) 202, one or more network or other communication interfaces 204, memory 206, a power source 208, a display 212, a mouse and/or keyboard 214, and one or more communication buses 210 for interconnecting these components. The communication buses 210 may include circuitry (sometimes called a chipset) that interconnects and controls communications between system components.

Figure 8A:
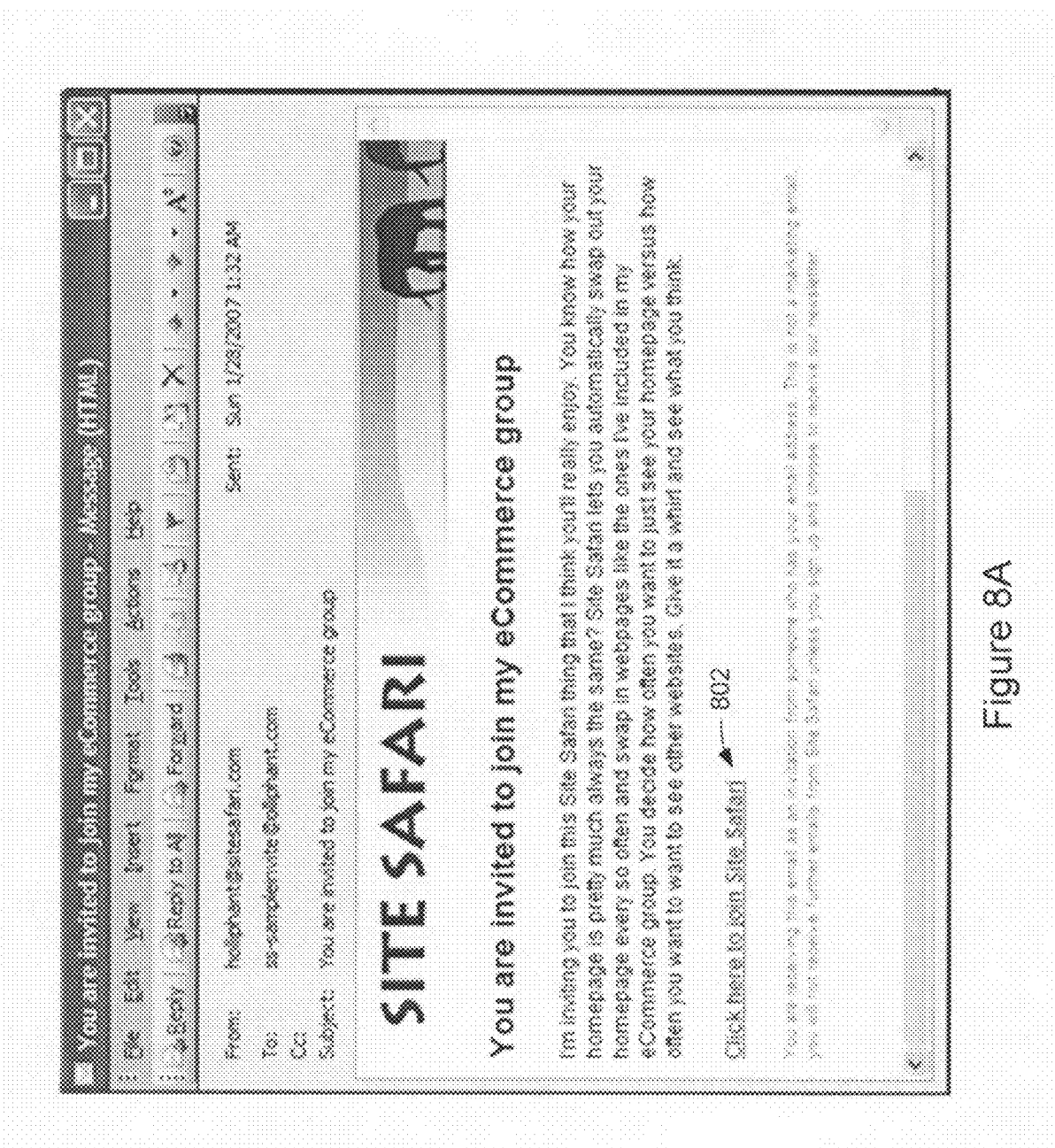
FIGS. 8A-8T are exemplary screenshots of the present system in accordance with some embodiments.
Figure 8B:
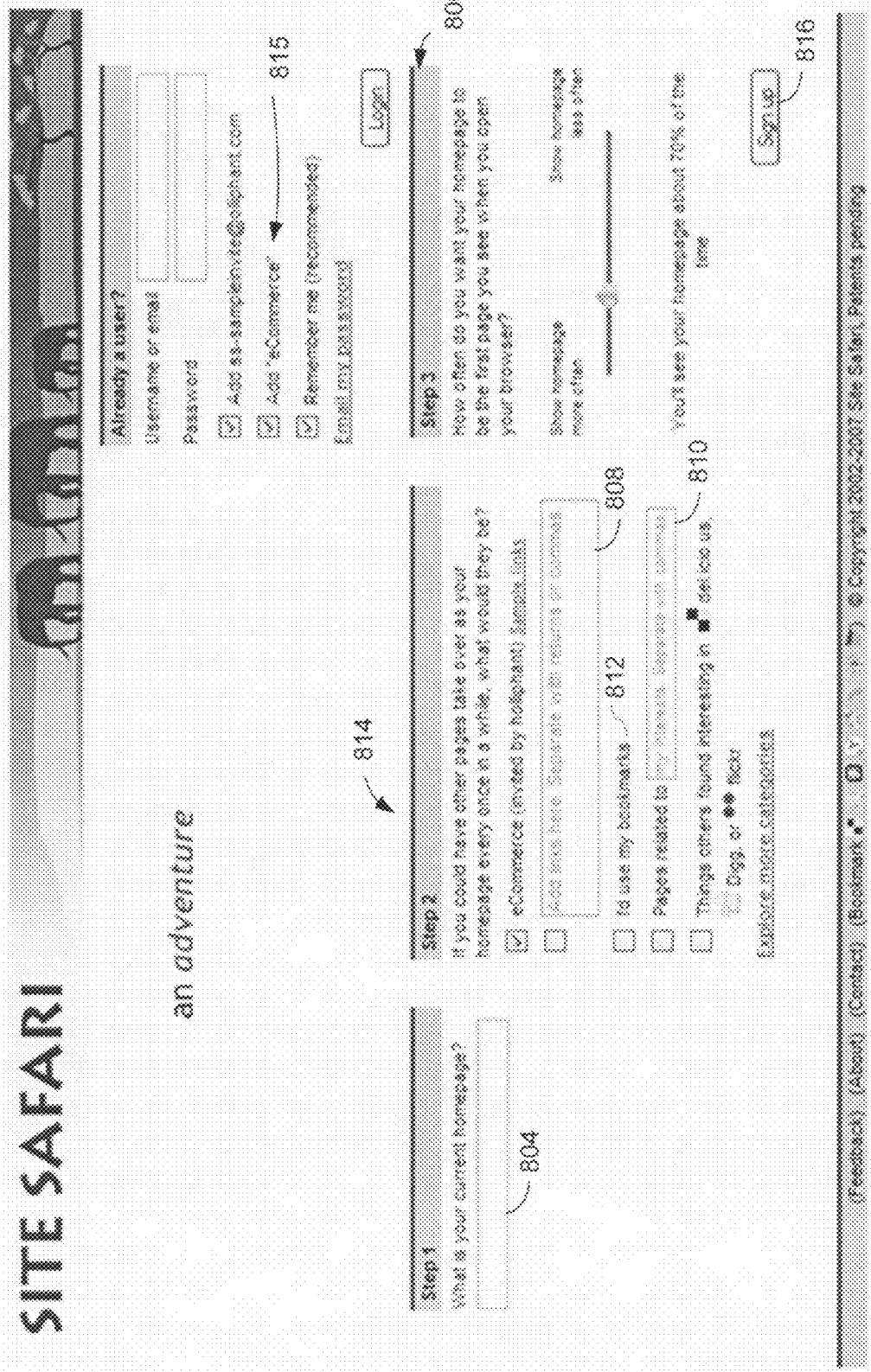
Figure 8C:
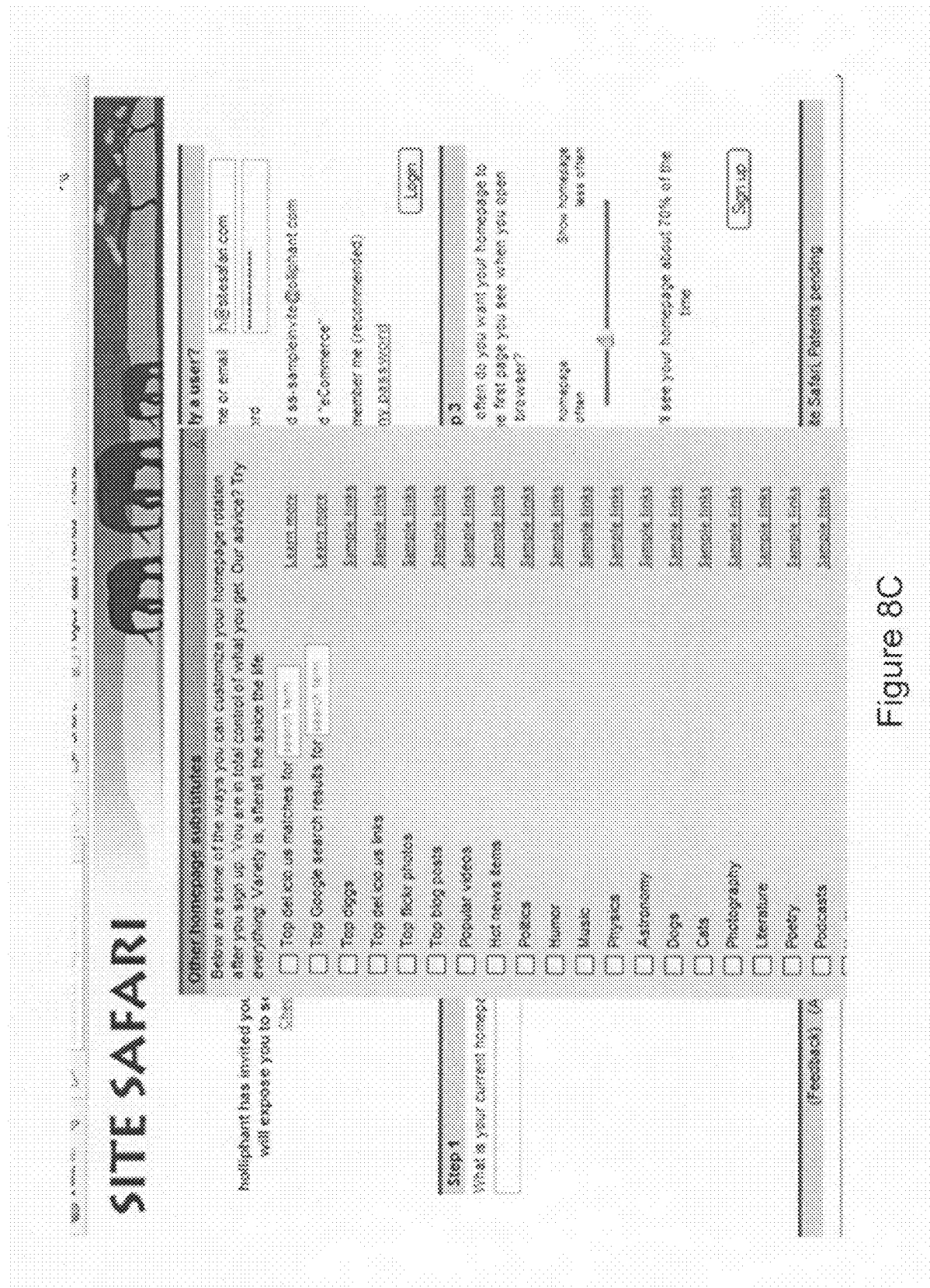
Figure 8D:
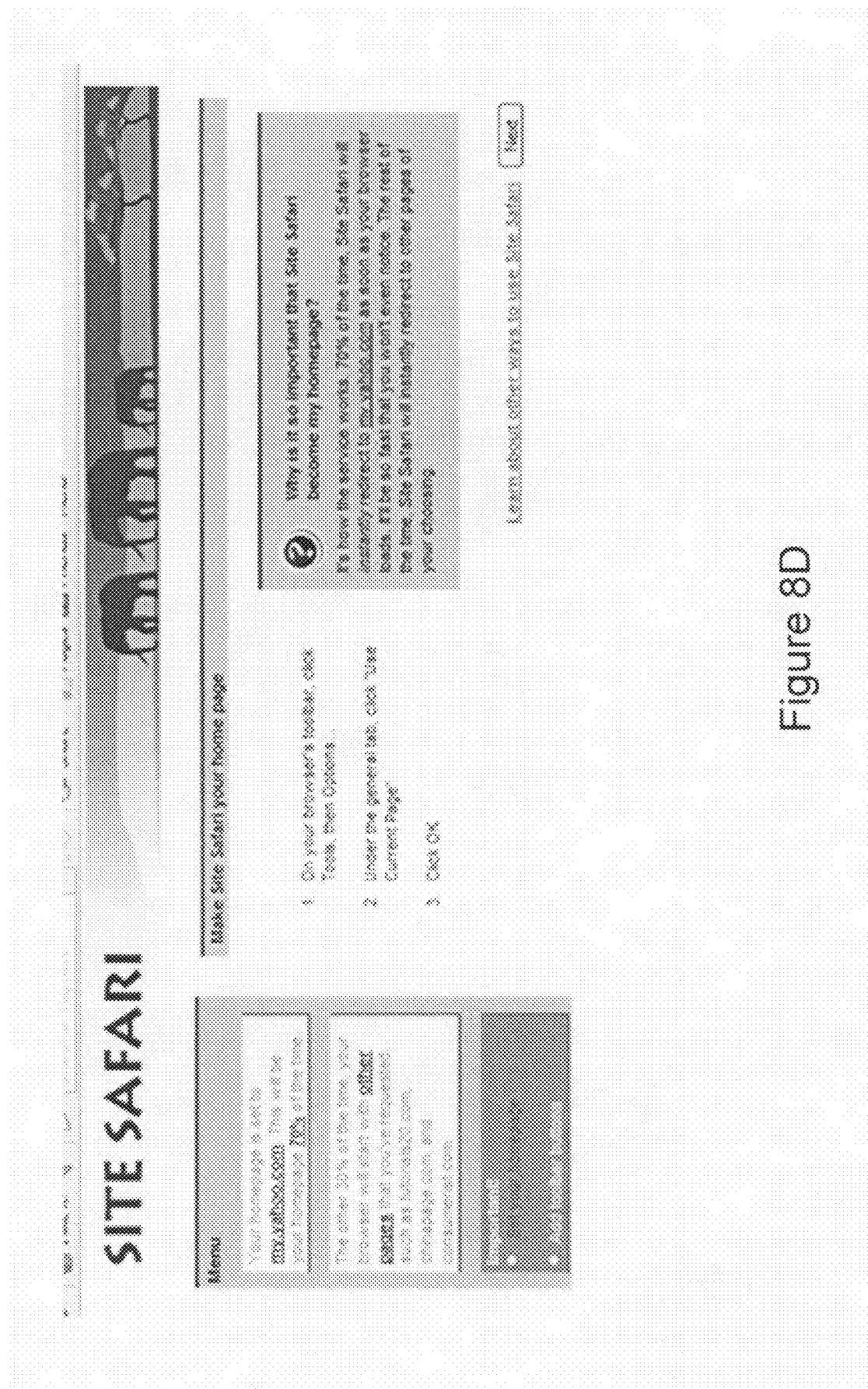
Figure 8E:
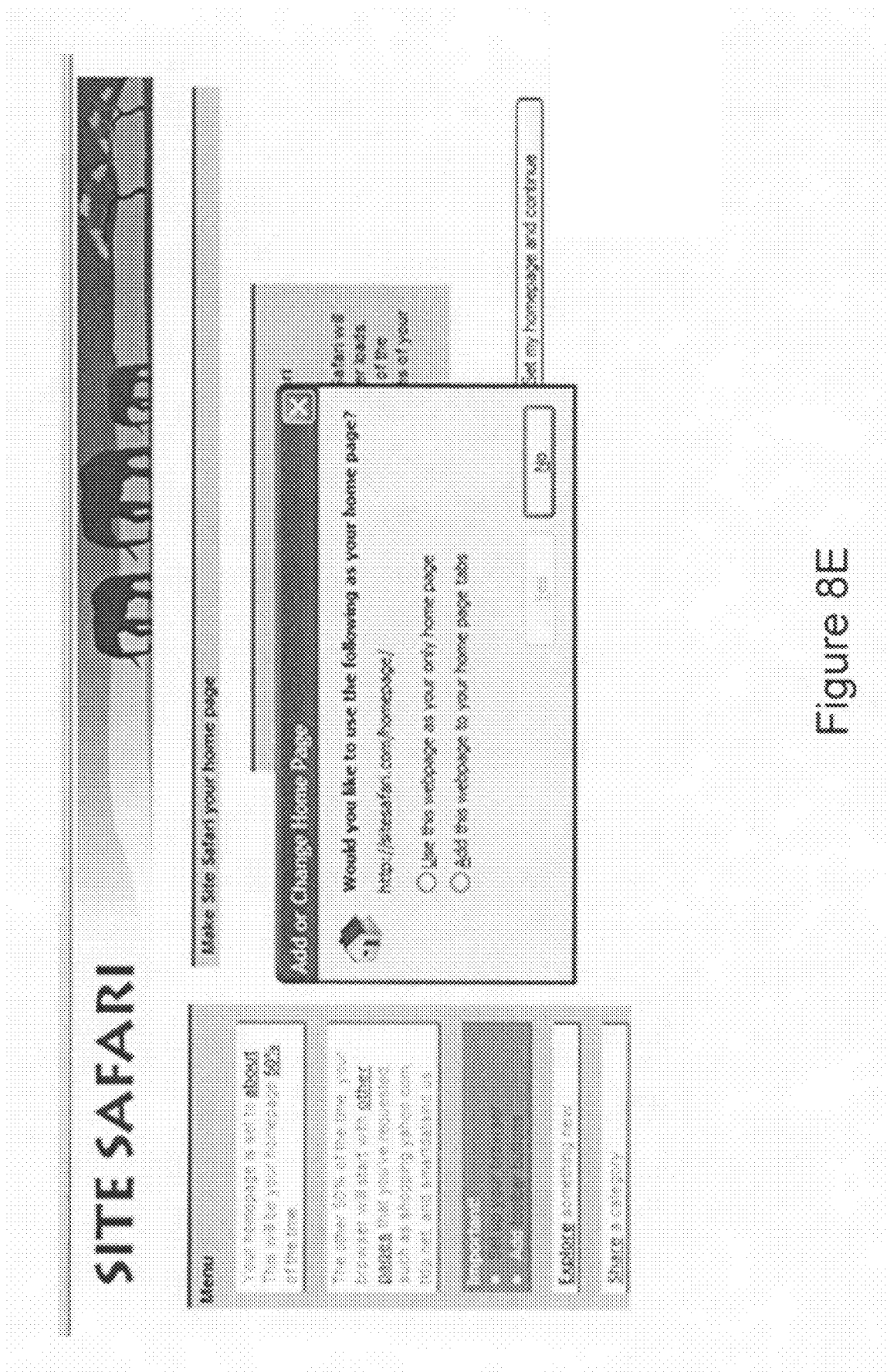
Figure 8F:
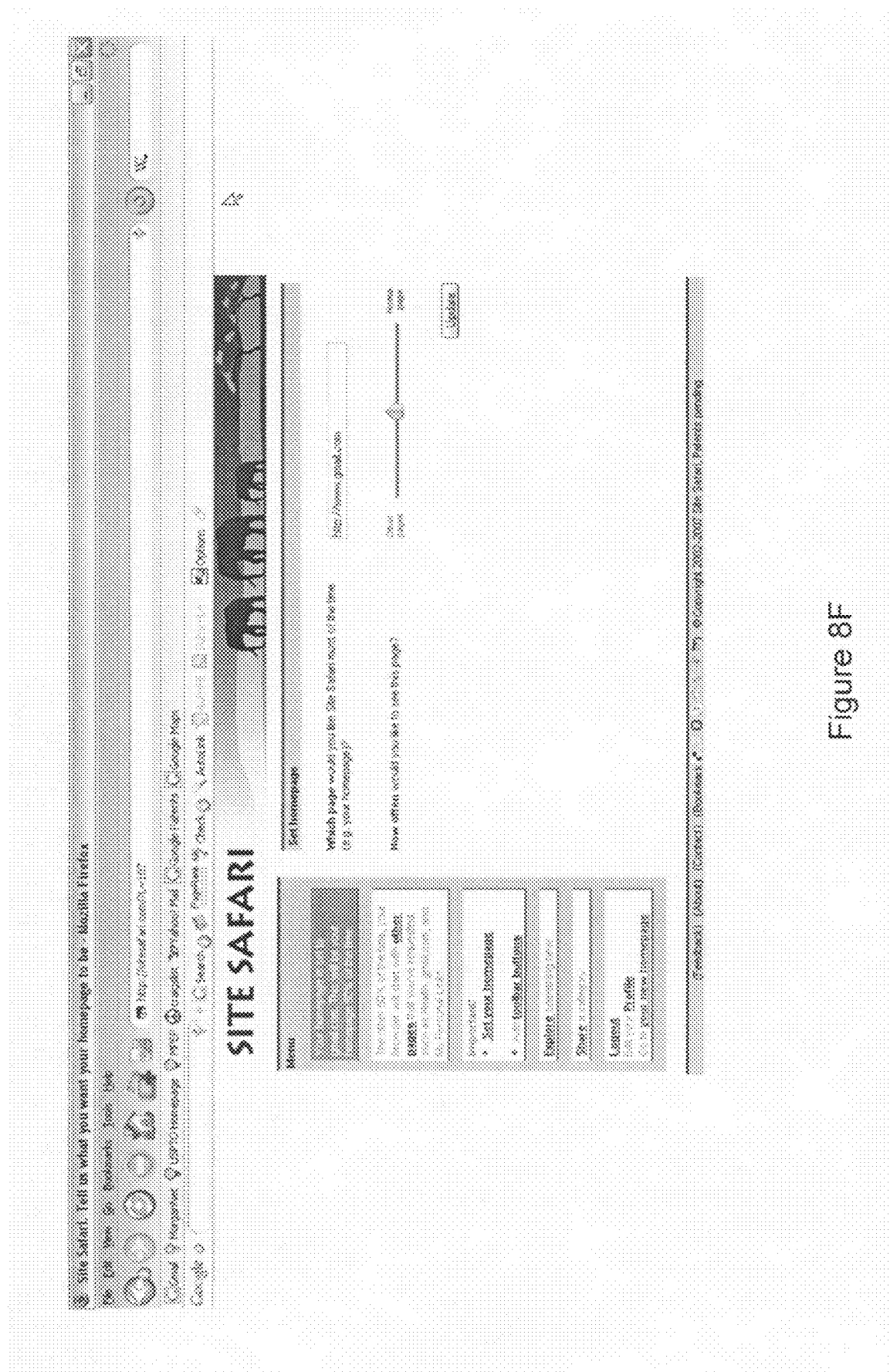
Figure 8G:
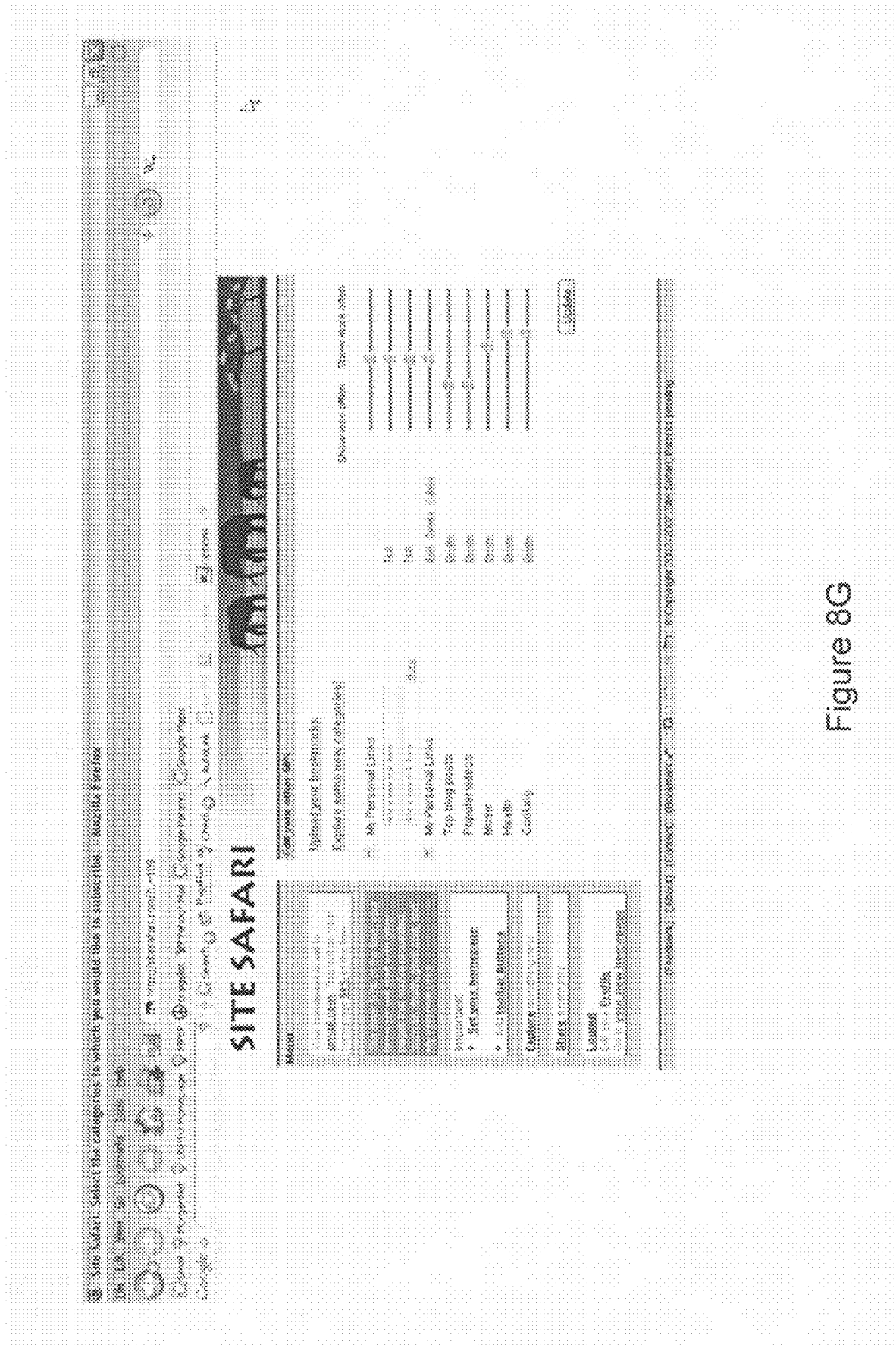
Figure 8H:
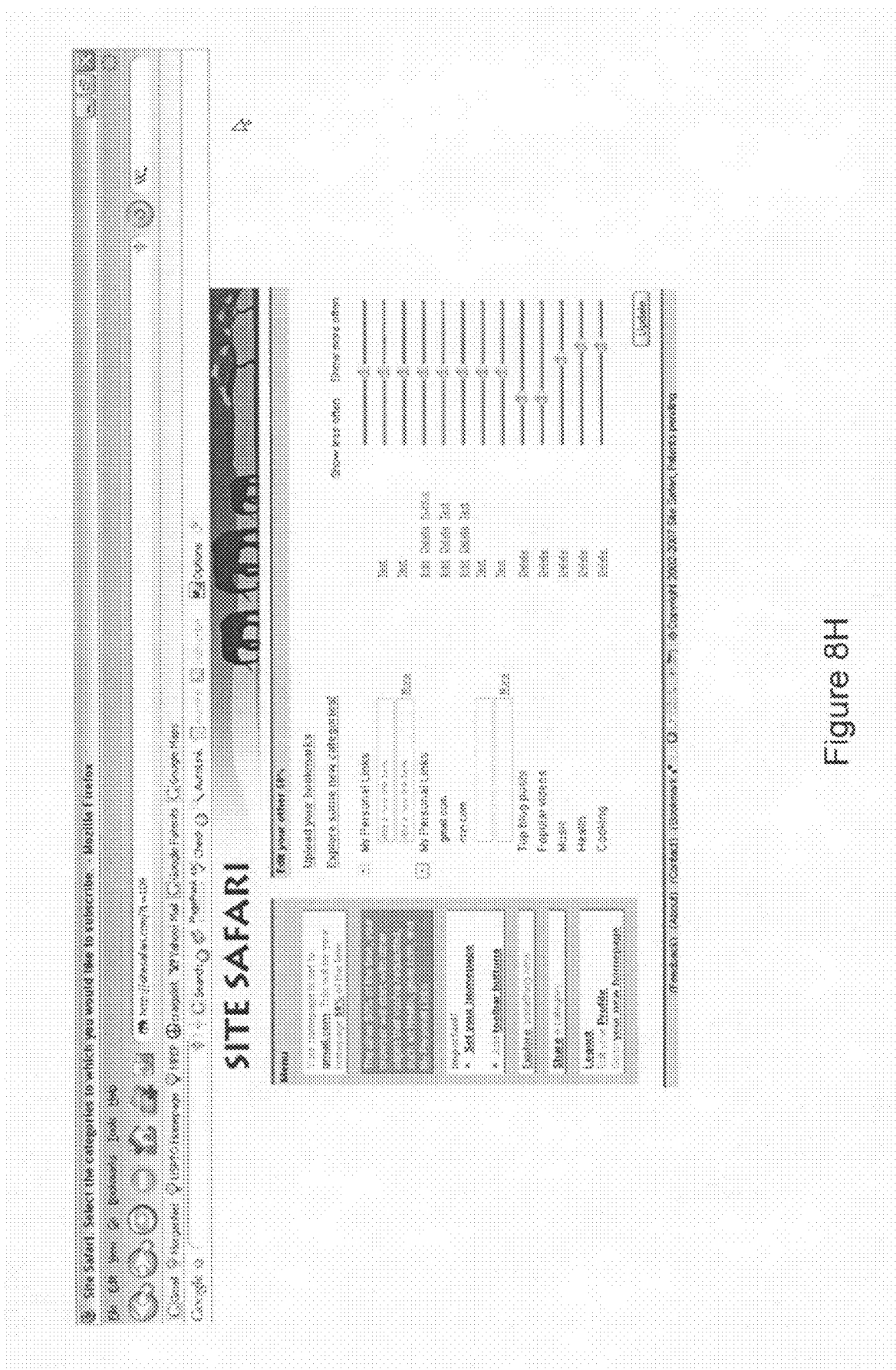
Figure 8I:
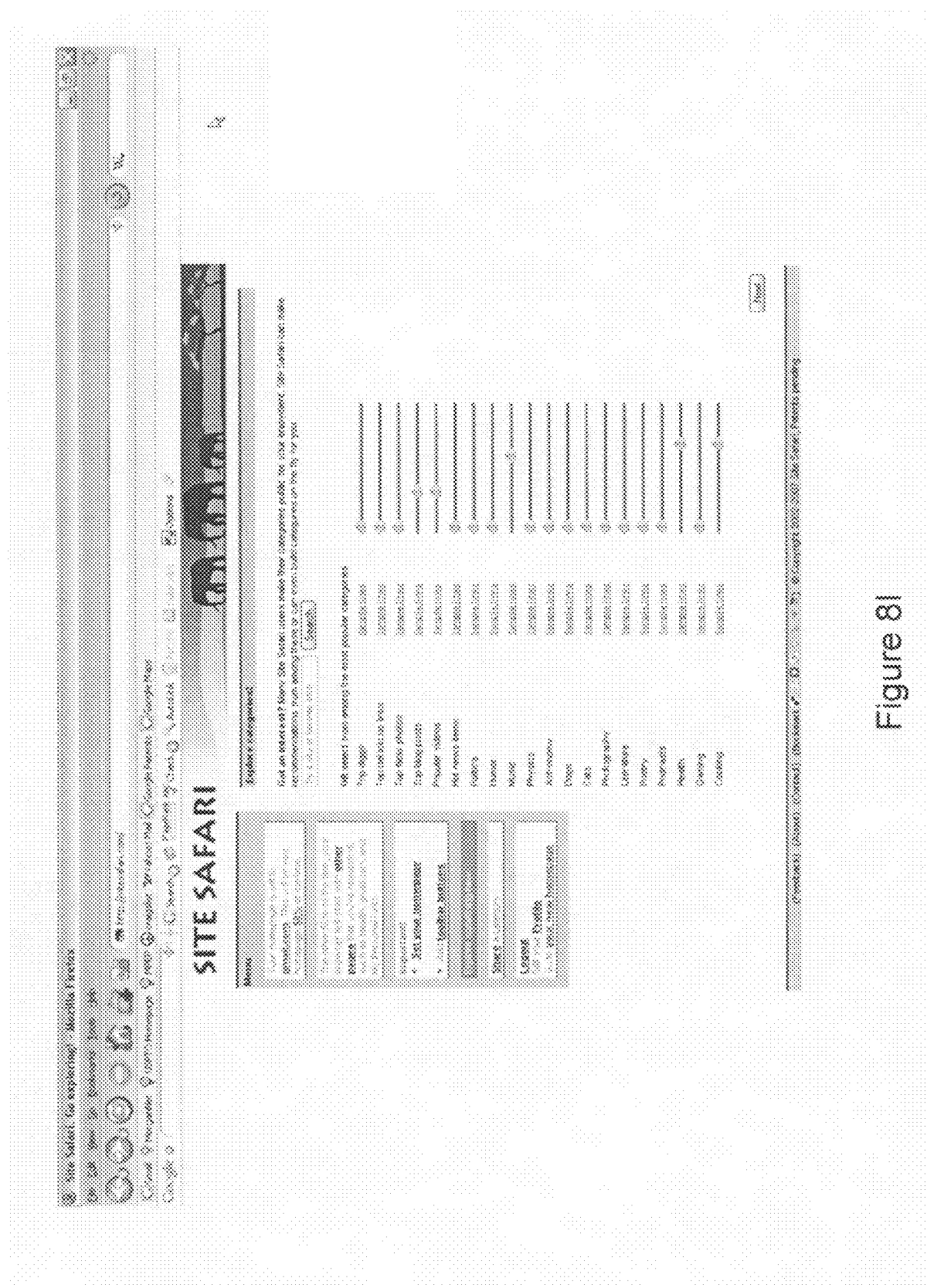
Figure 8J:
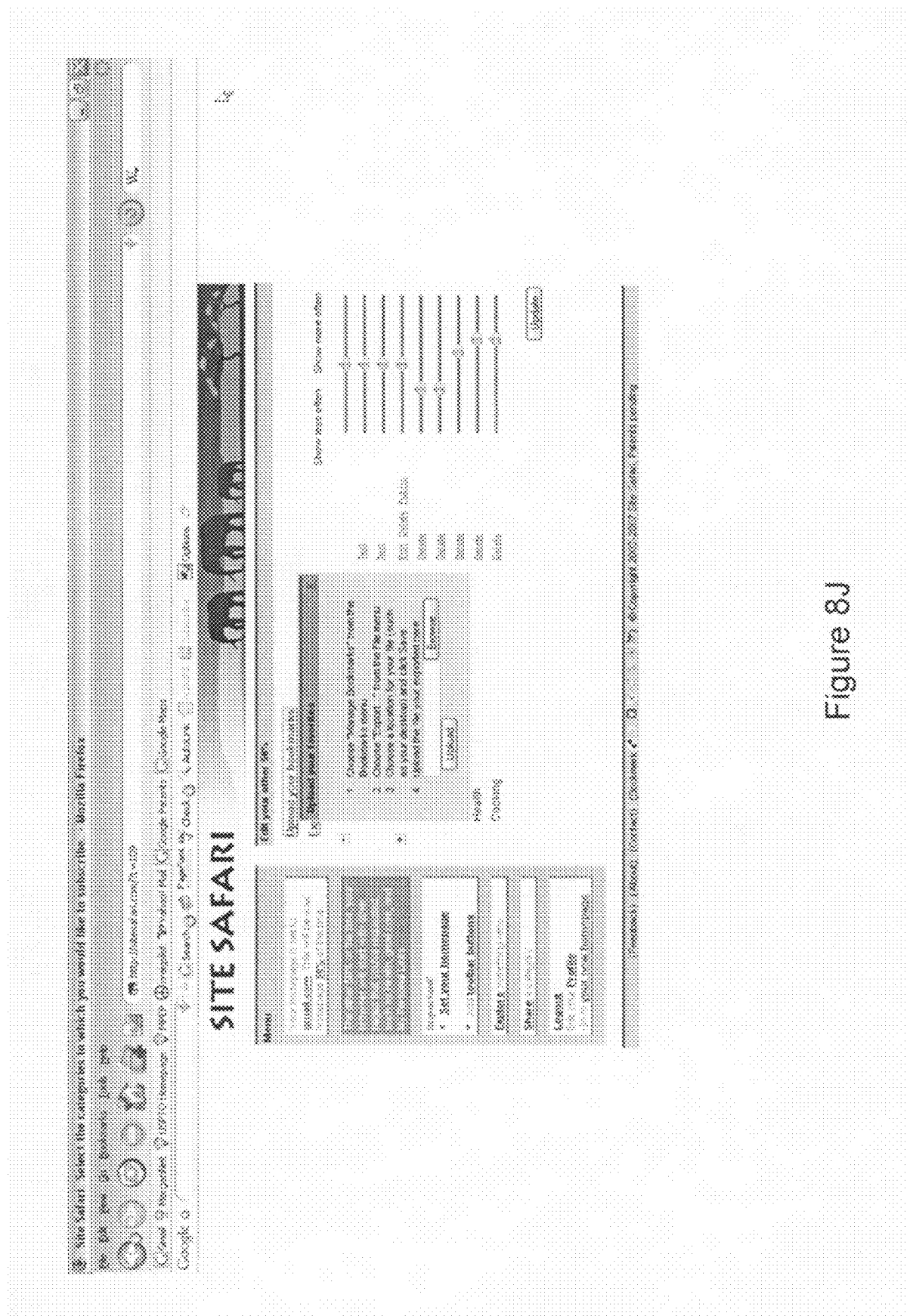
Figure 8K:
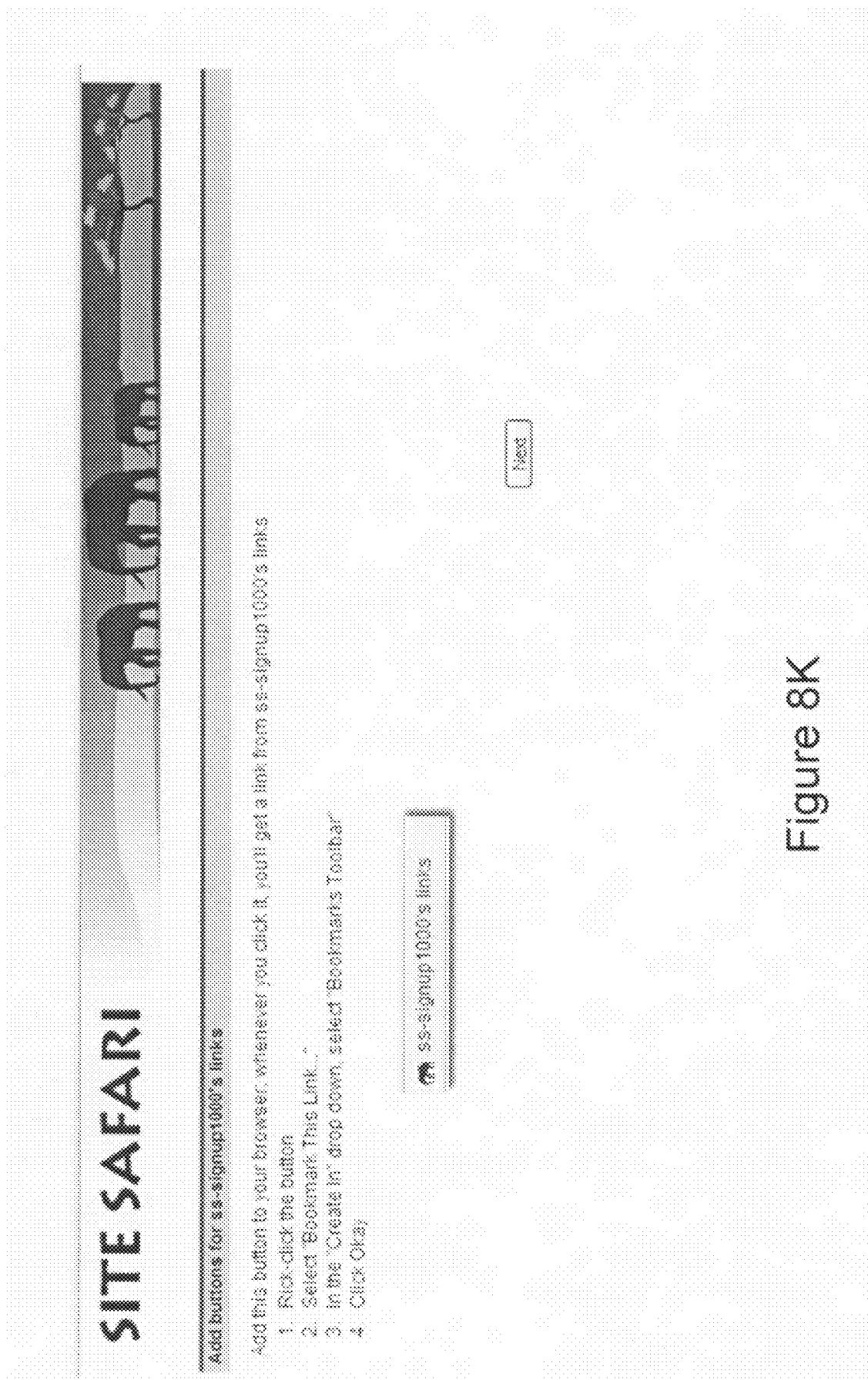
Figure 8L:
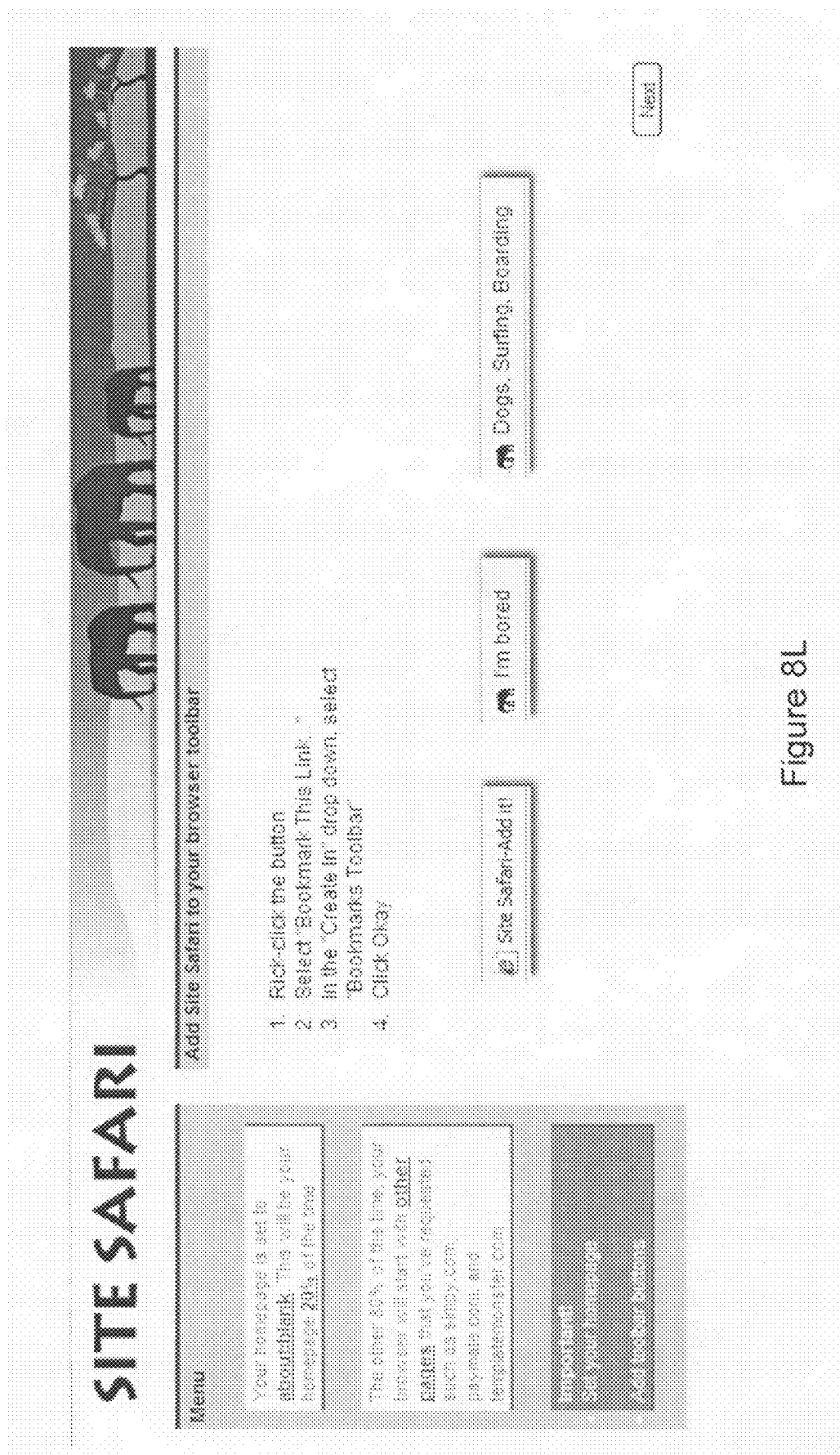
Figure 8M:
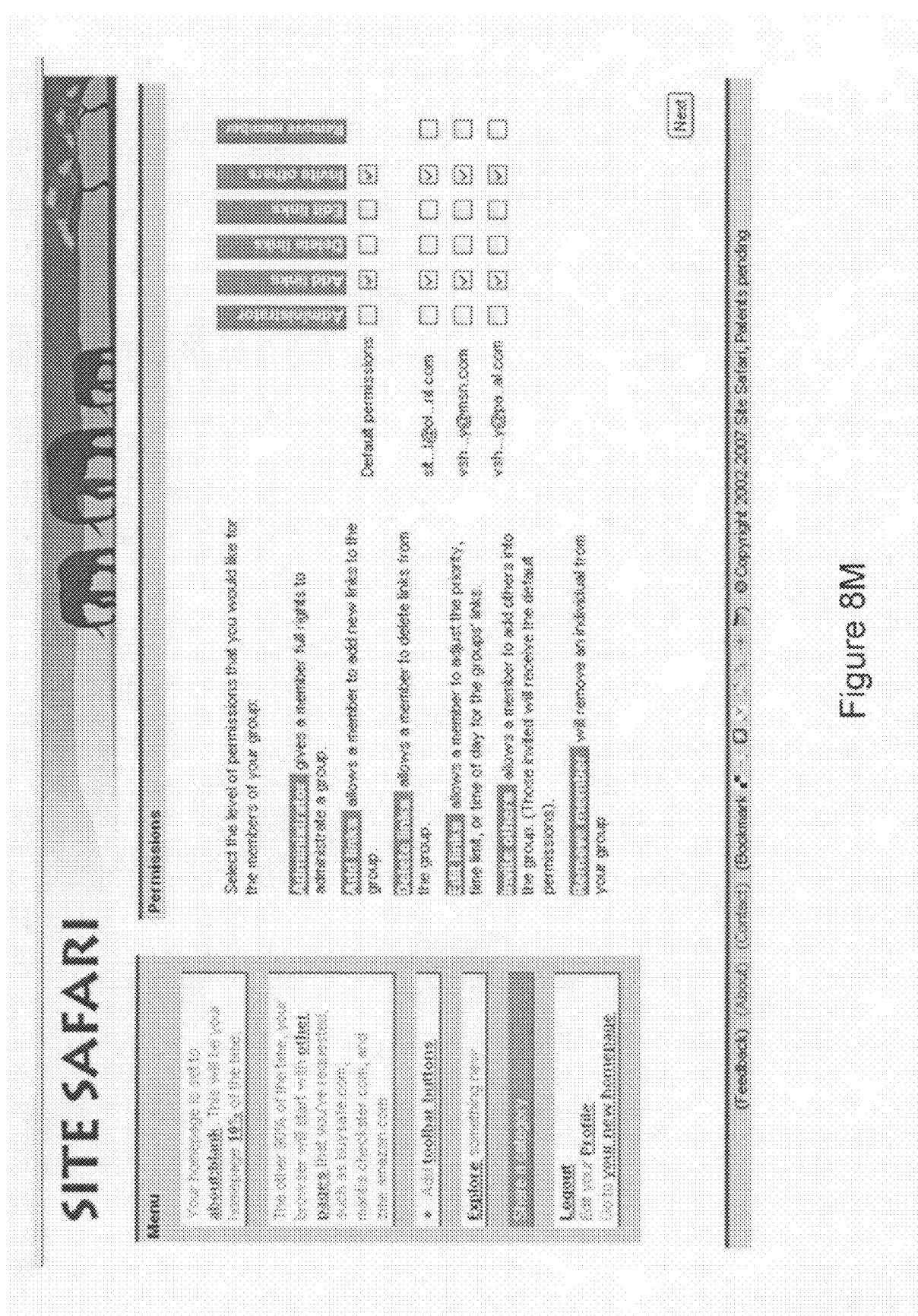

The memory 206 may include high speed random access memory, such as DRAM, SRAM, DDR RAM or other random access solid state storage devices; and may include non-volatile memory, such as one or more magnetic disk storage devices, optical disk storage devices, flash memory devices, or other non-volatile solid state storage devices. The memory may also include one or more hard disk drives located locally or remotely from the CPU(s) 202. In some embodiments, the memory 206 stores the following programs, modules, data structures, or a subset thereof:

- an operating system 216 that includes procedures for handling various basic system services and for performing hardware dependant tasks, e.g. LINUX or WINDOWS;
- a network communication module 218 that is used for connecting the server 106 to other computers via the one or more communication interfaces 204 and one or more communication networks 104 (FIG. 1);
- an editing module 220, which provides the interface through which users may define their preferences including link categories to which they subscribe, the specific links within the link categories that they own, and the relative importance of various links and link categories. The editing module 220 may also be used to access invitations and set permissions;
- an invitation module 222 that manages the invitations that users send to one another through the dynamic webpage server 106.;
- a link categorization module 224 that maintains and manages links, any link categories associated with those links, and users associated with the link categories;
- a permissions module 226 that manages permissions both across the application as well as within each link category. For example, a user might set up a link category which the user invites colleagues to join, but may set permissions so that the invited users are not able to invite anyone else to join the link category. FIG. 8M exemplifies a web interface to a permissions module;
- a history module 228 that stores access information about which links were visited by which users, when, and for how long, and also records any rating information that a user might have added for a particular link or group of links; and
- user profiles 230 that contain user specific data, such as unique user identifiers, user preferences, and other user related information.

Invitations within the invitations module 222 are associated with specific categories or groups of categories. Invitations are also tied to the permissions module 226 and the user profiles 230, described below, which allows category administrators to limit what invitees can do with the link category.

In some embodiments, the user profiles 230 not only store identifier information and user preferences for each user, but also stores invitation information, permissions, history, and other information unique to each user.

Figure 3:
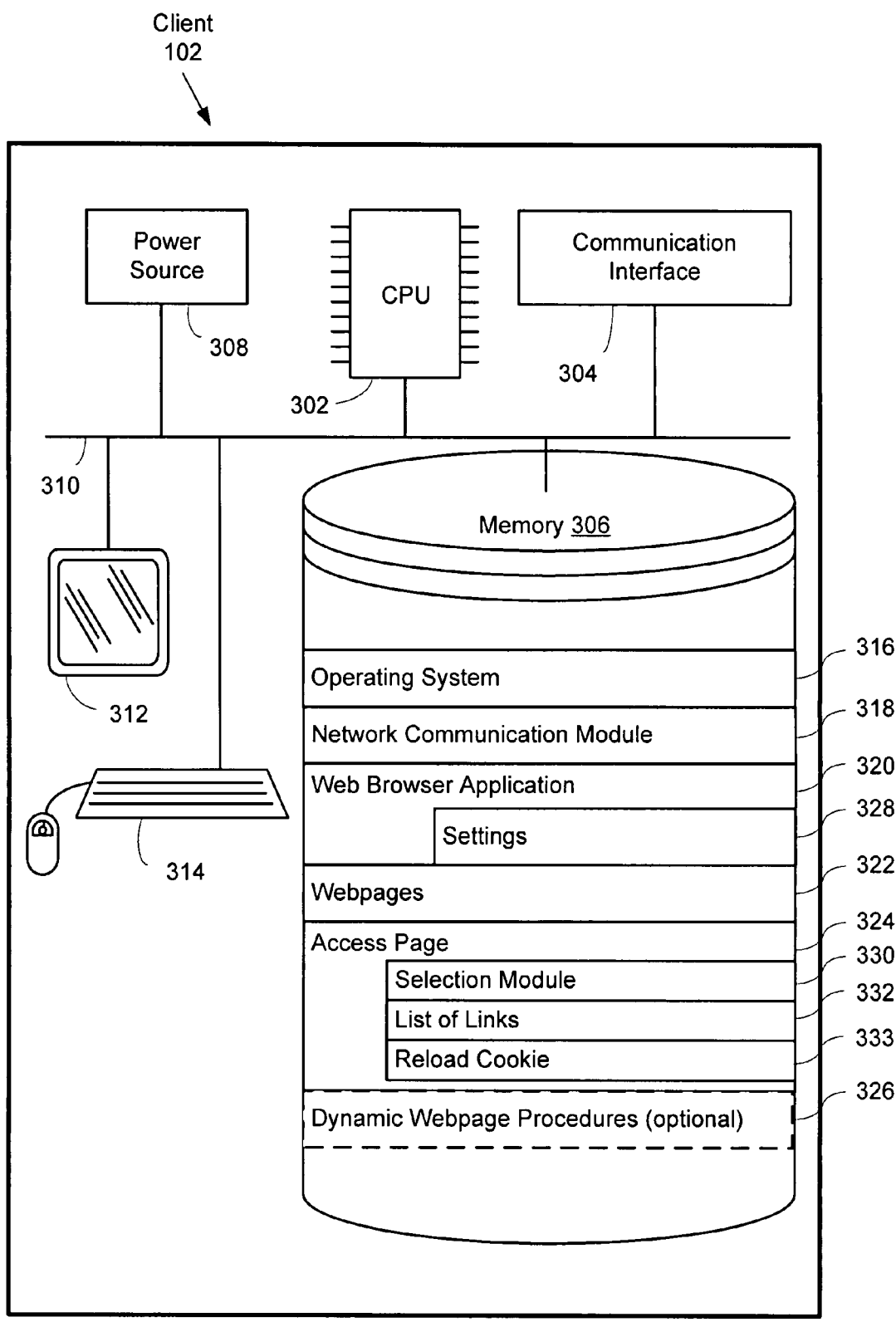
FIG. 3 is a block diagram of an exemplary client computing device in accordance with some embodiments of the present invention.

FIG. 3 is a block diagram of an exemplary client computing device 102 in accordance with some embodiments of the present invention. The client 102 typically includes one or more processing units (CPUs) 302, one or more network or other communications interfaces 304, memory 306, one or more power sources 308, a display device 312, and a keyboard and/or mouse 314, and one or more communication buses 310 for interconnecting these components. The communication buses 310 may include circuitry (sometimes called a chipset) that interconnects and controls communications between system components. The memory 306 may include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 306 may also optionally include one or more hard disk drives that are local or remotely located from the CPU(s) 302. In some embodiments, the memory 306 stores the following programs, modules and data structures, or a subset thereof:

an operating system 316 that includes procedures for handling various basic system services and for performing hardware dependent tasks;
a network communication module 318 that is used for connecting the client 102 to other computing devices via the one or more communication network interfaces 304 and one or more communication networks 104 (FIG. 1);
a web browser application 320, such as INTERNET EXPLORER or FIREFOX;
one or more webpages 322 that may be displayed by the web browser application 320; and
an access page 324.

The web browser application 320 permits a user to browse and view webpages 322 or other documents or information, and/or interact with the dynamic webpage server 106 (FIG. 1) and other webservers 110 (FIG. 1) to perform one or more tasks via the communication network 104 (FIG. 1). For example, the web browser application 320 may be FIREFOX, INTERNET EXPLORER, OPERA, or SAFARI. In some embodiments, the web browser application 320 also includes settings 328, such as user preferences and current homepage, and cookies, such as a reload cookie 333. Cookies are generated by the dynamic webpage server 106 and stored locally on the client 102.

The access page 324 is served by the dynamic webpage server 106 (FIG. 1) in response to an access link request. Note that, once served to the client-side browser 320, the access page 324 can be cached locally and may not need to access the server for particular access link requests. In some embodiments, the access page may contain selection module 330 code for selecting a link from a list of links and a list of links 332. The selection module 330 and list of links 332 are generated by the dynamic webpage server 106 and stored locally on the client 102. In these embodiments, the selection module 330 selects a link from the list of links 332 to display to the user. In some embodiments where websites are displayed based on the time of the day, day of the week, or day of the year, the selection module 330 first assesses what time it is and whether there are links that should be shown for this particular time (or day). In alternate embodiments, the selection module 330 assesses whether it should consider the homepage and it reviews the user's other preferences. Exemplary code for the selection module is illustrated in FIGS. 9A-9G.

In an alternative embodiment, the client 102 includes dynamic webpage procedures 326 that perform the functions otherwise performed by the dynamic webpage server 106 (FIG. 1). In this embodiment, the dynamic webpage procedures 326 may be incorporated into programs such as browser toolbars, browser plug-ins, or other programs that use the operating system 316.

Figure 4A:
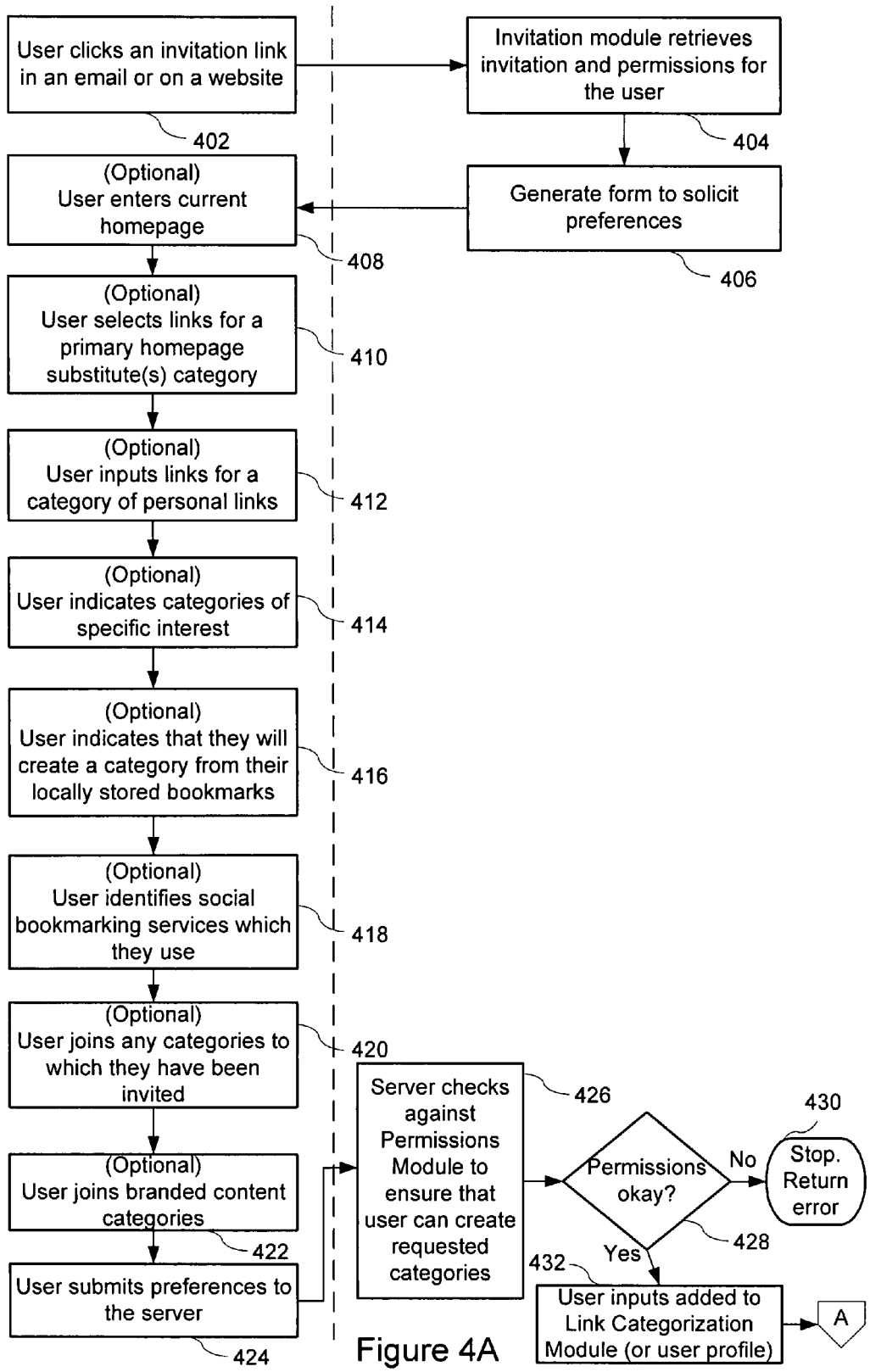
FIG. 4A-4D are flowcharts of a process for setting up link categories and user preferences in accordance with some embodiments.

FIG. 4A is a flowchart of a process 400 for setting up link categories and user preferences in accordance with some embodiments. In some embodiments, the process begins when a user selects an invitation link in an email or clicks on a link on a website (402). An example of a received email invitation is shown in FIG. 8A. In some other embodiments, the user begins the process either by visiting the dynamic paging service directly or selecting some other non-invitation link to visit the dynamic paging service. In some embodiments, the user may select a link that states "click here to join" 802 (FIG. 8A) to be directed to an initial set-up webpage (as shown in FIG. 8B).

Once a user has selected the invitation link at step 402, the invitation module 222 retrieves the invitation information and permissions information associated with that particular invitation from either the invitation module (222—FIG. 2) or the user profiles (230—FIG. 2) at step 404. In other words, if the user clicked on an invitation link, then the dynamic paging service will look up the invitation specified in the link and retrieve any associated link categories. The server will also retrieve the permissions from the permissions module (226—FIG. 2) that the person who transmitted the invitation (who could be the owner of the link category) intended for recipients of the specified invitation. The server then generates a webpage to solicit preferences from the user, at step 406, and transmits that webpage to the client. An example of an initial set-up webpage is shown in FIG. 8B. The set-up webpage is intended to solicit any additional preferences, which were not contained in the invitation, from the user.

In some embodiments, the user may enter the link (e.g., URL) associated with their current homepage in inquiry field 804 (FIG. 8B) at step 408. Alternatively, for browsers that support tabbed browsing, multiple homepages may be selected. As shown in FIG. 8B, the user provides their primary homepage in field 804 and controls how often the current homepage will be displayed using the slider shown at 806.

In some embodiments, the user may select links for a primary homepage substitute category (i.e., FIG. 8C) at step 410. The user may also choose to create a category of links for his or her primary homepage. Link categories that directly substitute for a user's homepage may be treated differently by the dynamic paging service in that users typically may want to specify how often pages in a homepage link category appear. The user may input their own links for a category of links at step 412. For example, the user may enter links into the field 808 shown in FIG. 8B.

In some embodiments, the user may also indicate categories of specific interest at step 414 (i.e. FIG. 8B). For example, the user may enter their interests in specific topics into field 810 as shown in FIG. 8B. The user's interests are either matched to predefined topics stored in the link categorization module 224 (FIG. 2) on the dynamic webpage server 106 (FIG. 2) or the top search results for those interests are harvested from an online search engine. The predefined topics may be managed by one or more link category administrators. In an alternative embodiment, a user can select categories from a list of various topics or interests. In other embodiments, the user may also search for interests.

In some embodiments, the user may also create a category from their locally stored bookmarks at step 416. For example, the user can indicate his or her preference to upload locally stored bookmarks from their browser by checking the box labeled, "[i]'d use my bookmarks" 812 as shown in FIG. 8B. As described below, these bookmarks may be manually uploaded by the user (see FIG. 8J). In other embodiments, bookmarks may be uploaded through a client-side program such as a toolbar, plug-in or other program.

In some embodiments, the user may also rely on social bookmarking services, to provide the appropriate link categories for the user at step 418. Examples of some bookmarking sites include services such as DEL.ICIO.US, FURL.NET, REDDIT, YAHOO'S MY WEB, and others which store users' favorite links, help users to categorize those links, and optionally allow users to view the categories and links of other users. Some bookmarking sites such as DIGG.COM specialize in reporting on the popularity of links among the users of those services. In all cases, a user of the dynamic paging service can create categories associated with specific bookmarking sites. In the previous examples, the user can join a category of the top links featured on sites such as DIGG.COM or DEL.ICIO.US. An alternative to the example shown would include the ability to create a category that specifically ties to a user's own account at such a bookmarking website. For example, if a user has an account at DEL.ICIO.US in which the user has stored a category of links about string theory, then the user could provide sufficient credentials to the dynamic paging service to retrieve their stored links at DEL.ICIO.US and place these links into a link category. Further details of this process are described below.

Figure 8N:
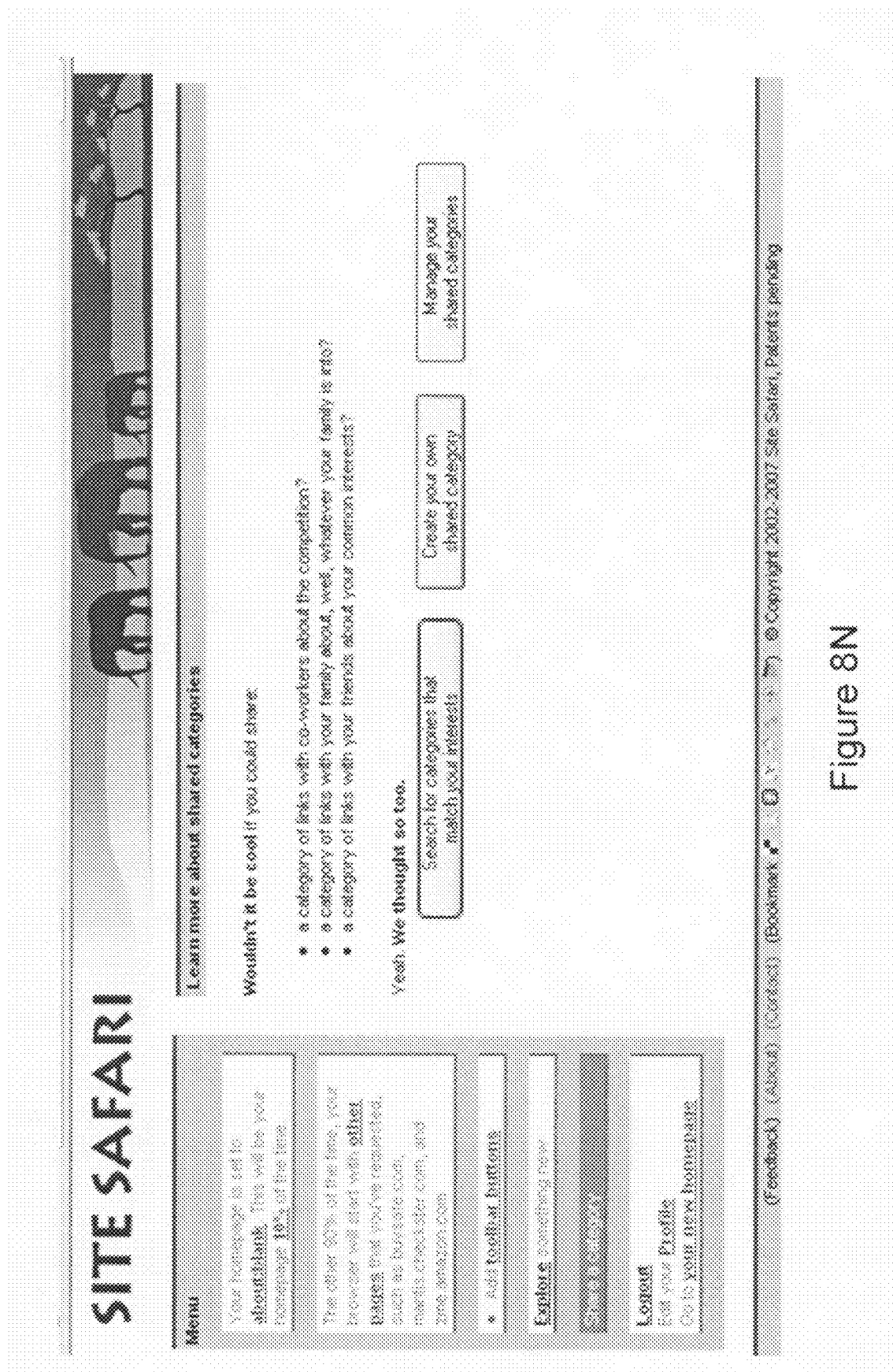
Figure 80:
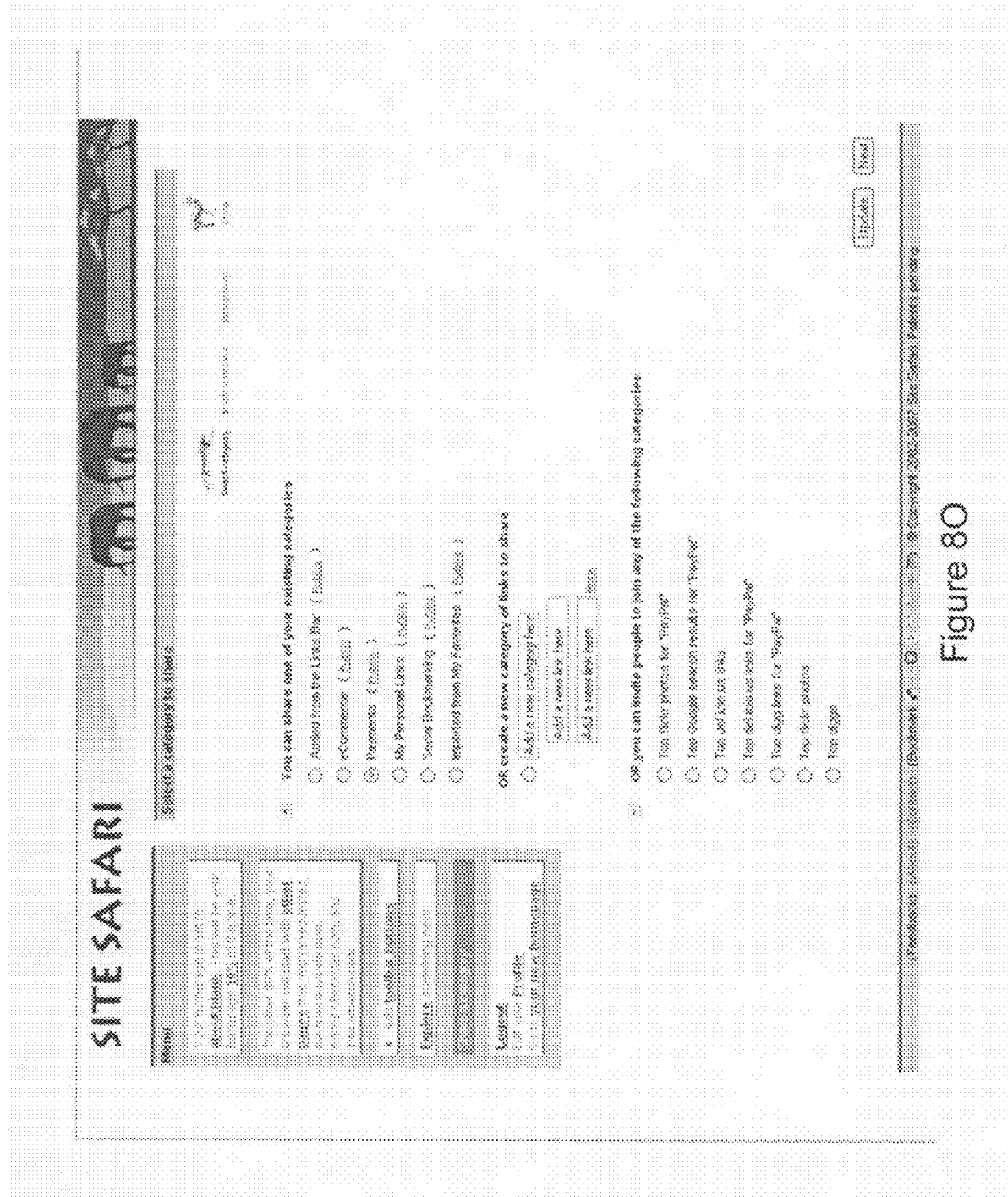

In some embodiments, a user may share their categories or manage categories they have previously shared (e.g. FIG. 8N). In other embodiments, the system may prompt the user to select a category to share (e.g. FIG. 8O).

In some embodiments, the user may also join any categories to which they have been invited at step 420. If the user had initiated the categorization flow by selecting an invitation link, then the dynamic paging service would add the link categories associated with that particular invitation to the user's link categories. The user, however, may also reject an invitation to automatically add link categories to their list of link categories. For example, as shown by reference numeral 815 in FIG. 8B, a user "holliphant" invited the user to join an eCommerce Link Category, which the current user could deselect. Alternatively, the invitation (including associated link categories) may be automatically accepted when the user selects the invitation link.

Figure 8P:
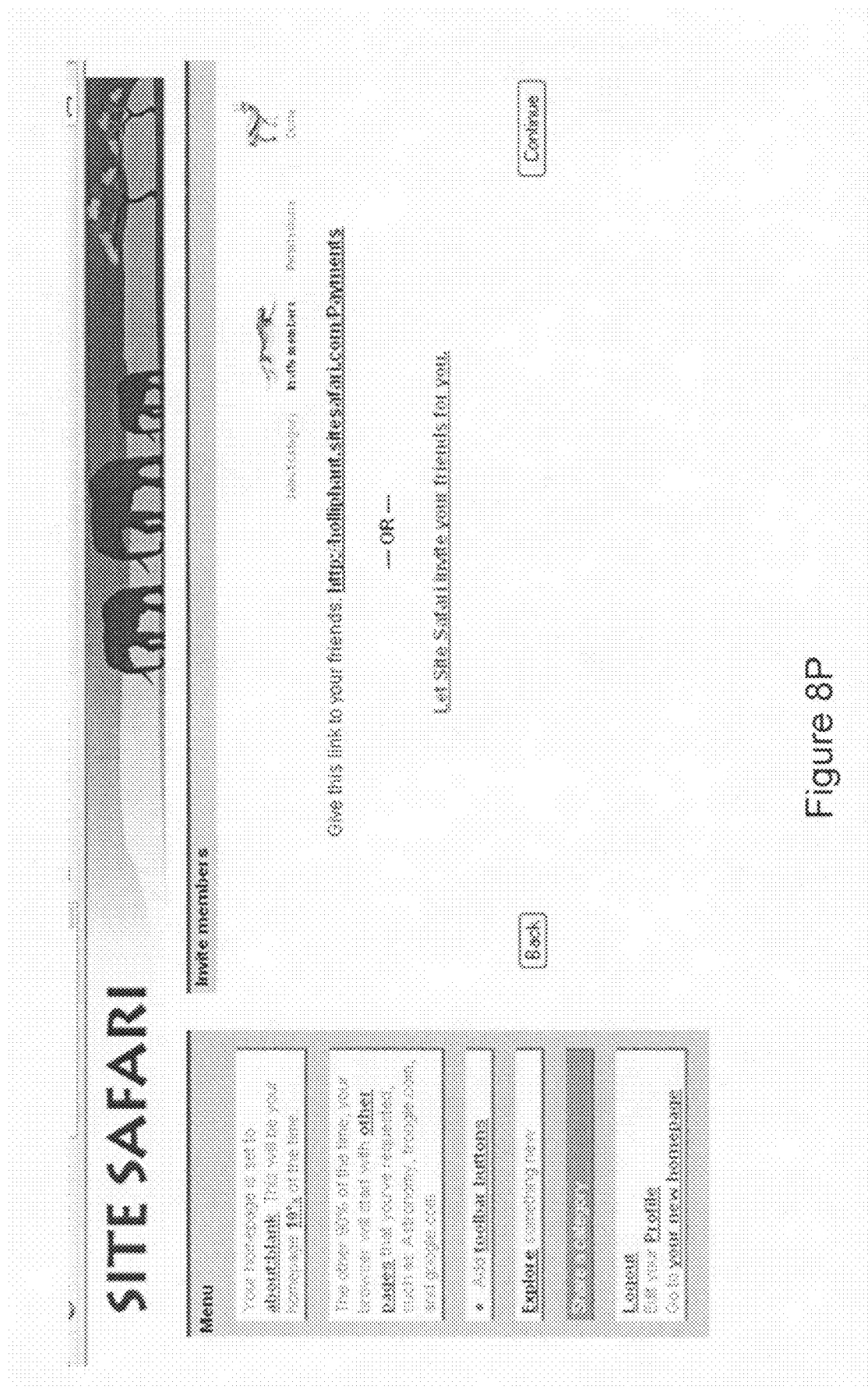
Figure 8Q:
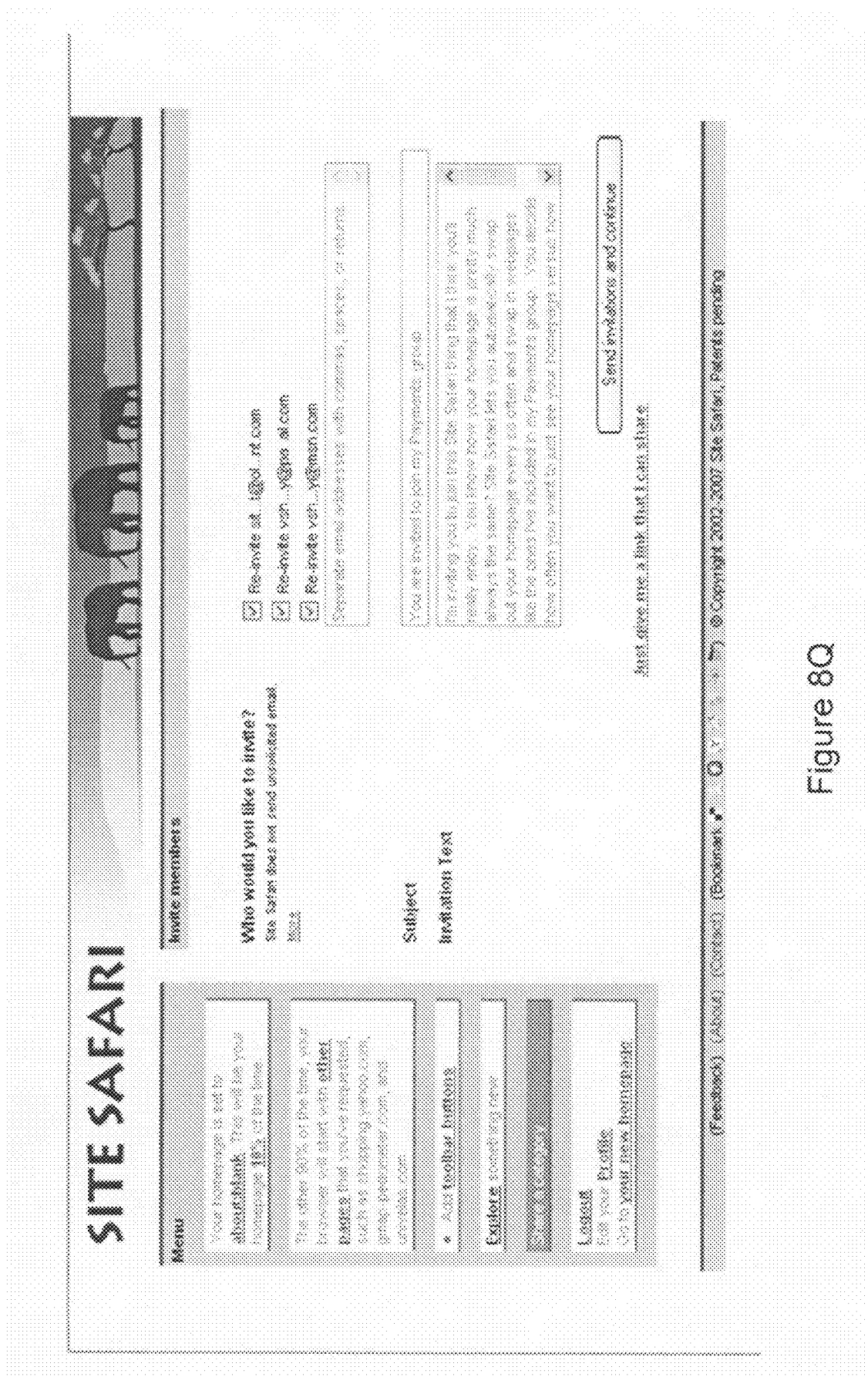
Figure 8R:
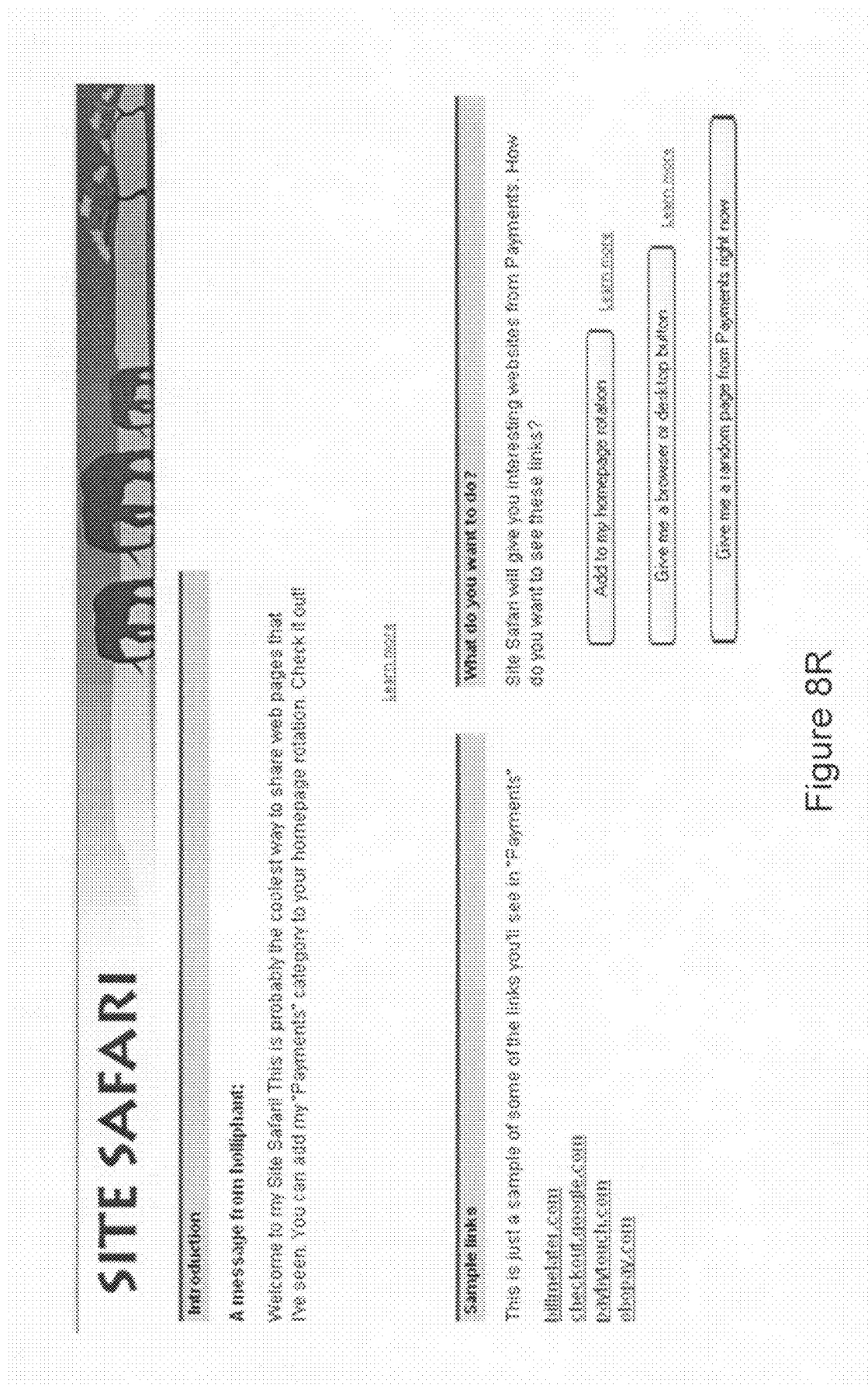
Figure 8S:
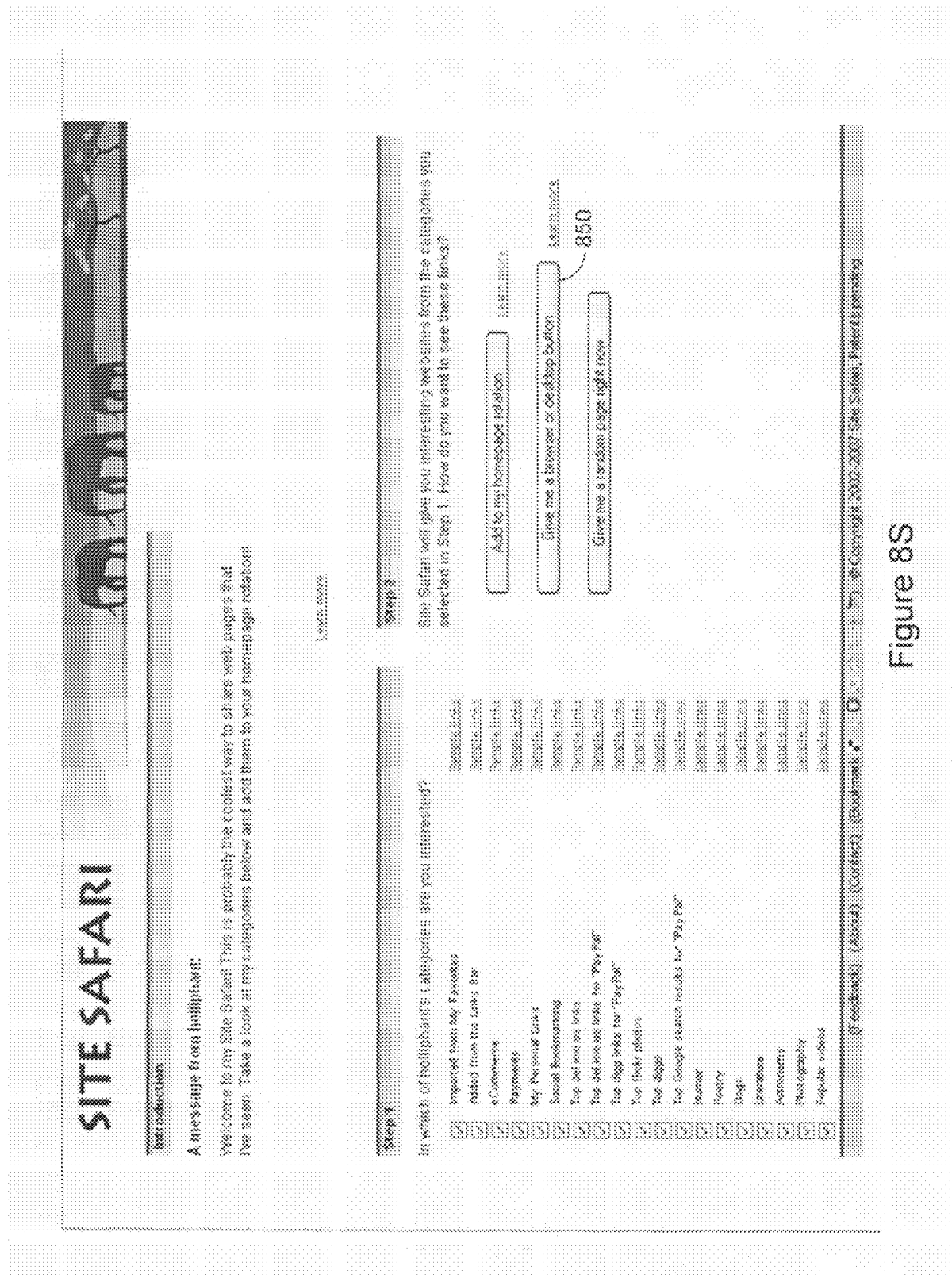

In alternate embodiments, in the example shown in FIG. 8Q, a user may create invitations for others to participate in a specific category. A recipient of that invitation may then receive the created invitation to join the specific user's category. An example of this is show in FIG. 8P. Additionally, in alternate embodiments, a user may also be invited to join one or more categories belonging to another user (e.g. FIG. 8S).

In some embodiments, the user may also join branded content categories at step 422. For example, a user might indicate a desire to join a link category associated with a specific content provider. In the previous example, a user had the option to join a link category containing popular FLICKR photographs. Similar link categories can be promoted and managed by other content providers such as WIRED.COM or even MYSPACE. To the extent that special subcategories of links within those content provider's sites are relevant to the user, the user can provide the credentials necessary for the dynamic paging service to retrieve those links and place these into a link category. An example of this would be a user who provides their MYSPACE username so that the dynamic paging service can deliver the profile pages of friends to which the user is connected. The branded content categories may be managed by a category administrator from the content provider.

Once the preferences have been selected, the user submits the preferences to the server at step 424. In some embodiments, this may be accomplished by clicking the "Sign Up" button 816 as shown in FIG. 8B.

Figure 4B:
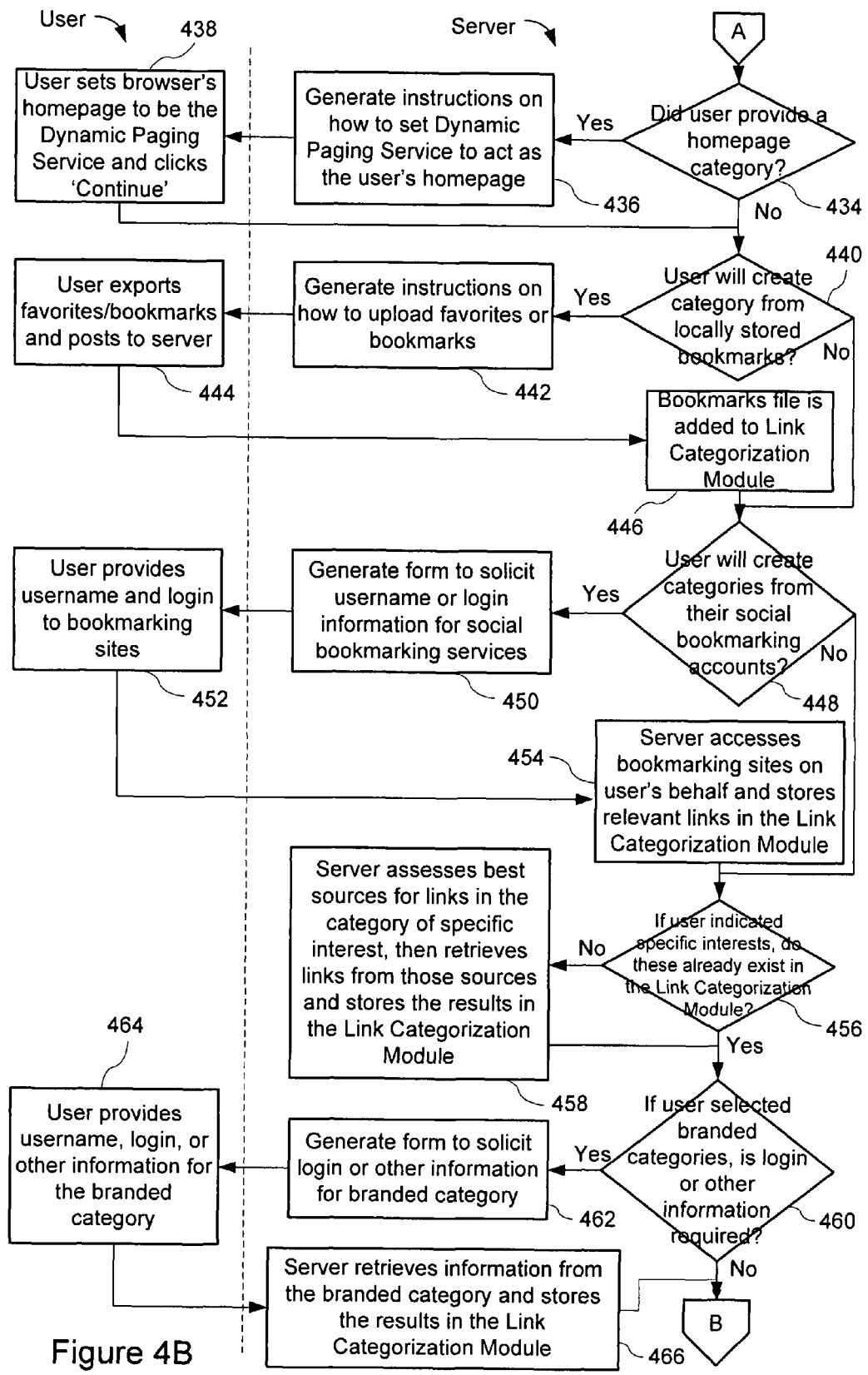

The permission module 226 (FIG. 2) of the dynamic webpage server 106 (FIG. 1) checks the user profile to ensure that the user can create the requested categories at step 426. A determination is then made to determine whether the permissions are satisfied at step 428, e.g., whether the user has the appropriate permissions to create or add the specified link categories to their profile. If the user does not have the appropriate permissions to create or add the requested categories (428-No), then an error message is returned to the client at step 430. If the user does have the appropriate permissions to create the requested categories (428-Yes), then the user's inputs (e.g., preferences) are added to the link categorization module, at step 432, and the requested categories are added to the user's profile. The server 106 (FIG. 2) records the user's selections as they are received. The next steps process those selections to ensure that the link categories are set up as the user intended, as illustrated in FIG. 4B.

An inquiry is performed as to whether the user provided a homepage category at step 434. If the user provided a homepage category (434-Yes), then the server generates instructions for the user on how to set the dynamic paging service to act as the user's homepage, at step 436; sends the instructions to the user; and the user sets the browser's homepage to be the dynamic paging service, see, for example, 438 in FIG. 8D. Another example of this is shown in FIG. 8E. An alternative version of this allows client-side software such as a previously downloaded toolbar or active-X control to automatically set these browser preferences for the user.

If the user requested locally stored bookmarks to be included (440-Yes), then the server generates instructions on how to upload favorites or bookmarks, at step 442 and exemplified in 8T, and the user exports the favorites or bookmarks and uploads them to the server at step 444. Alternatively, as described above, these bookmarks may be automatically located and uploaded to the server.

If the user does not add links from locally stored bookmarks (440-No), then the bookmarks link are not added to the link categorization module or the user's profile. Also, after the user exports favorites or bookmarks and posts them to the server, at step 444, the bookmarks file is added to the link categorization module at step 446. Once submitted, the dynamic paging application parses the uploaded file to extract the links, link descriptions, and categories for the bookmarks/favorites. These links are then stored in the link categorization module.

If a user creates categories from their social bookmarking accounts (448-Yes), then the server generates a form to solicit username and login information for the social bookmarking service at step 450. The user may provide his/her username and password to the bookmarking sites, at step 452, which is sent to the server. The server may then access the bookmarking sites on the user's behalf and store the relevant links in the link categorization module at step 454. In other words, at the time of dynamic link generation or any time earlier, if the user indicated that they would like to use an account with a bookmarking service to create link categories, then the dynamic paging service will solicit the relevant information from the user in order to retrieve the links from the social bookmarking site. For example, if a user indicated that they wanted to attach their DEL.ICIO.US account to the dynamic paging service, then the dynamic paging service would solicit the user's DEL.ICIO.US username, password, and any tags or categories of particular interest to the user. The server would then use this information to retrieve relevant links from DEL.I-CIO.US on behalf of the user, and store the links in the link categorization module. In other embodiments, the links are stored in the user's profile. Note that it may not be necessary to solicit a user's password to their bookmarking site if that site displays publicly accessible information about the user's links.

If a user indicated that they had interests in predefined categories, then the server will consult with the link categorization module to evaluate whether link categories already exist for those interests at step 456. If the user indicated specific interests and these do not already exist in the link categorization module (456-No), then the server determines the best sources for links in the category of specific interests, and retrieves links from those sources and stores the result in the link categorization module at step 458. In some embodiments, the results are stored in the user's profile. For example, if the user indicates that they have an interest in "parrots" and the link categorization module does not have any link categories that relate to "parrots," then the server will create new link categories related to "parrots" by retrieving parrot-related links from various web databases such as GOOGLE, DIGG.COM, DEL.ICIO.US, other public search engines, FLICKR photographs, and/or other sources and/or databases.

If the user indicated specific interest and these already exist in the link categorization module (456-Yes), and if the user selected branded categories and login or other information is required (460-Yes), then the server will generate a form to solicit login or other information for the branded category, at step 462. The user provides username, login, or other information, at step 464, and the server retrieves information from the branded category and stores the result in the link categorization module at step 466.

If a user expressed an interest in content or webpages associated with a specific brand or content provider, then the dynamic paging service will associate the user with that brand/content provider in the link categorization module. An example of this might be where a user decides to subscribe to the link category maintained by WIRED Magazine. However, additional information may be required from a user to access these branded categories of links. For example, if a user decides that they want to add a link category consisting of their MYSPACE friends, then the dynamic paging service will generate a page that solicits the user's MYSPACE profile name. After receiving this input from the user, the server will retrieve the links associated with the user's MYSPACE friends and assign these to a new link category.

Figure 4C:
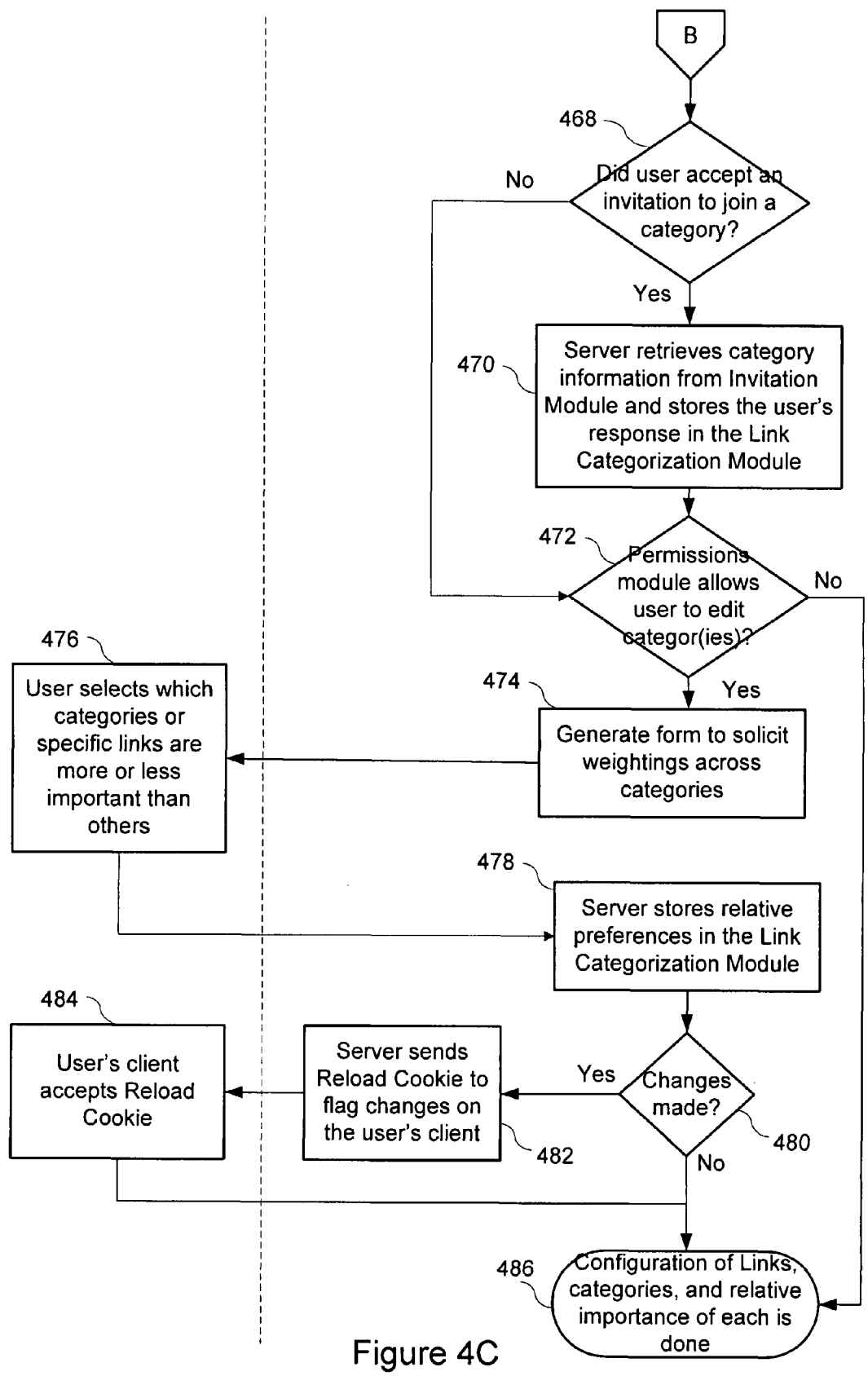

If branded categories were selected by the user, but no login or other information was required for those branded categories (460-No), then a determination is made as to whether the user accepted an invitation to join a category at step 468 (FIG. 4C). If the user has accepted an invitation to join a category (468-Yes), then the server retrieves category information from the invitation module and stores the user's response in the link categorization module at step 470. In some embodiments, the user's response is stored in the user's profile.

If the user has not accepted an invitation to join a category (468-No), or if the server has completed the storing of the user's invitation response, then the permissions module determines whether the user has permission to edit any links or categories. If so (472-Yes) then the server generates a form to solicit weightings across categories or edits within categories at step 474. The user may then select which categories or specific links are more or less important than others at step 476. Additionally, step 476 may also allow the user to edit specific links or categories as permitted. An example of a webpage that solicits these weightings and edits is in FIG. 8H.

Upon submission, the server stores the user's selections in the link categorization module at step 478. In some embodiments, these selections are stored in the user's profile.

If any changes to the user's preferences have been made (480-Yes), then the server sends a reload cookie to flag changes on the user's client, at step 482, and the user's client accepts the reload cookie at step 484. If changes have not been made, the configuration of the links, categories and relative importance of each is completed at step 486. Additionally, if there are no permissions to allow the user to edit these categories (480-No), then the links, categories, and relative importance of each is completed at step 486. Note that the use of the reload cookie at step 484 allows the client to keep locally cached preferences, which in turn speeds the responsiveness of user requests. When a reload cookie is sent to the client, then the client understands to update its local cache with new information from the server when the user next makes a request for a dynamic page. In some embodiments, a caching mechanism is not used and the responsiveness to user's requests is slower. In these embodiments, when a user makes a dynamic paging request by opening a browser, clicking a toolbar button, or through some other means, the client requests updated preferences directly from the server and does not rely on a local cache.

Figure 4D:
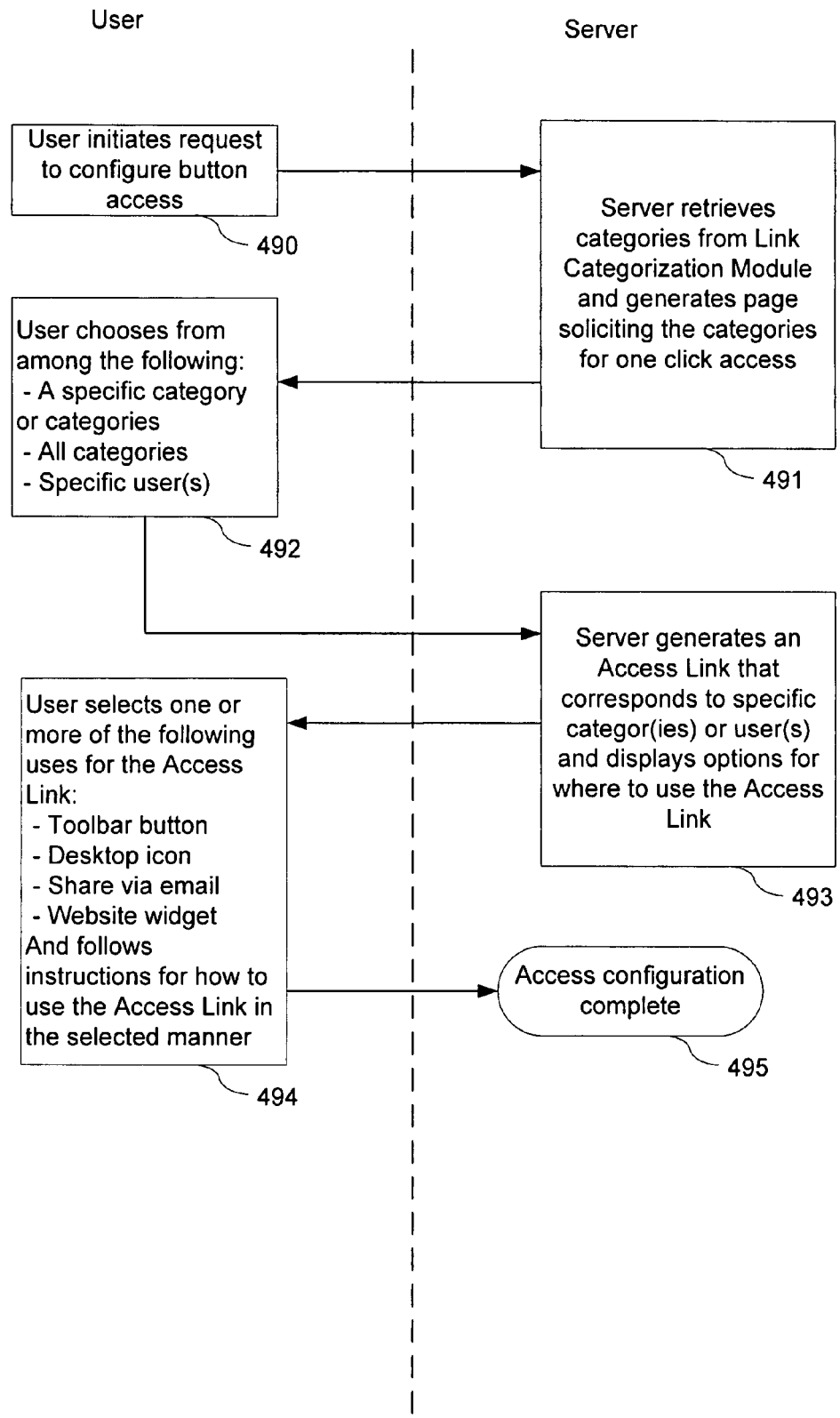

Additionally, during the preferences set-up process, a user may also configure browser and/or desktop icons to access the chosen links. FIG. 4D is a flowchart of a process for configuring button access. The process begins when a user initiates a request to configure button access (490). For example, in some embodiments, a user clicks on an invitation link or enter the appropriate URL into the browser. The server then retrieves categories from the link categorization module and generates a page soliciting the categories for one click access (491). An example of such a page is exemplified in FIG. 8S. The user may then choose among several options (492). Examples of such options may be: a specific category or categories of links (Example "Specific Category or Categories"; all categories (Example "All Categories"); a specific user (Example "Specific User"), or a specific user's category (Example "Specific User's Category").

The server generates an access link that corresponds to one or more specific categories (Examples "All Categories", "Specific Category or Categories", "Specific User's Category") or one or more users (Example "Specific User") and displays options for where to use the access link (493). The user may then select one or more uses for the access link and follow instructions for how to use the access link in the selected manner (494). FIGS. 8K and 8L illustrate some of the button configuration options that would be available to a user. In some embodiments, examples of such uses are applicable to: toolbar button; desktop icon; share via email; and website widget. Button access configuration is then completed (495) and an associated button would appear on the user's toolbar or on the user's desktop.

Figure 5:
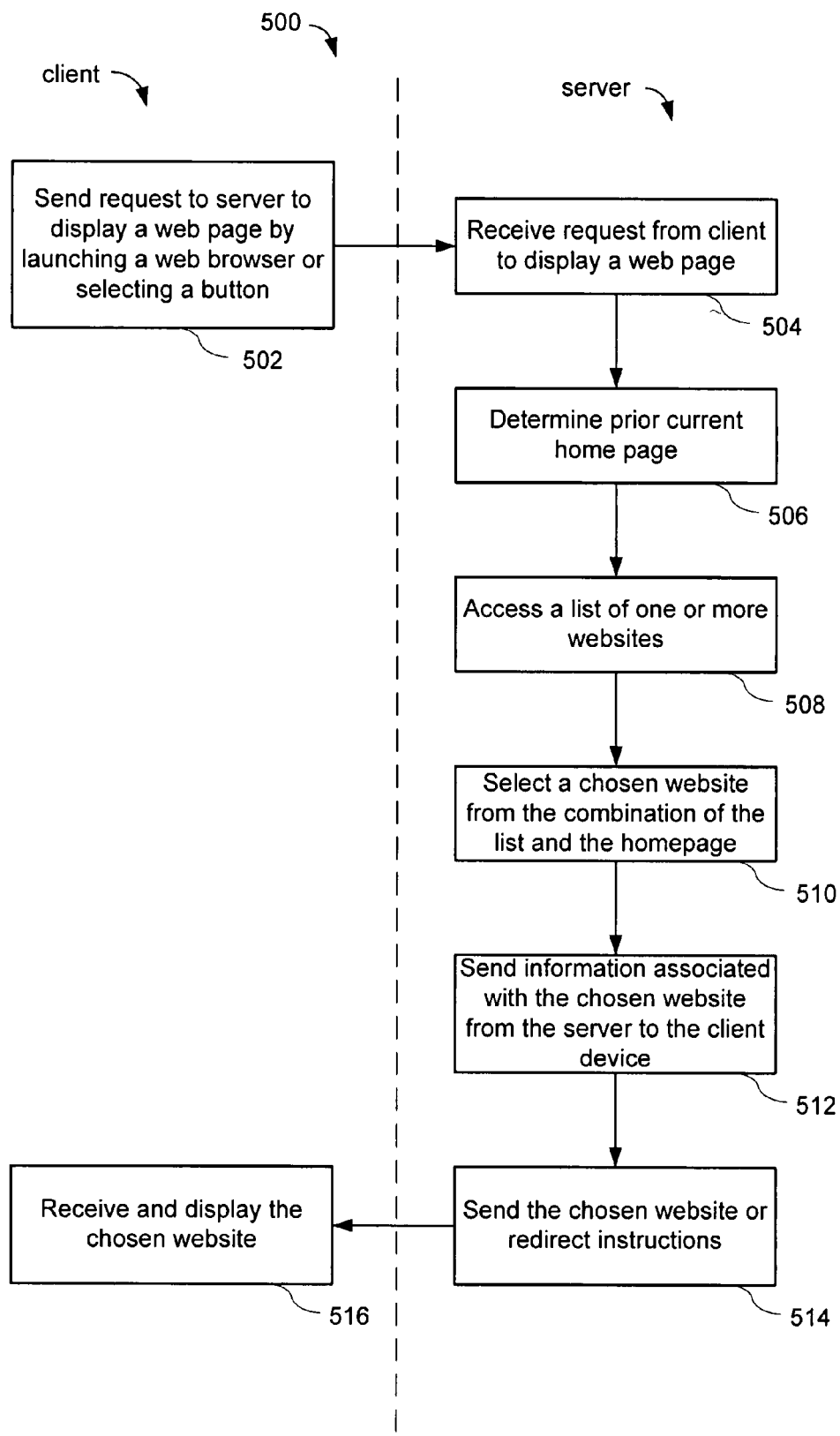
FIG. 5 is a flowchart of a process for dynamically selecting and presenting a webpage in accordance with some embodiments.

FIG. 5 is a flowchart of a process for dynamically selecting and presenting a webpage, according to some embodiments. Process 500 begins when the server receives a request, at step 504, from a client to display a webpage by either the launching of the user's browser or by the user selecting a toolbar button or desktop icon at step 502. In some embodiments, the request includes a unique identifier of the client or user. The server authenticates the request sent by the client and checks the user's profile and other identifying information, including user preferences, based on the unique identifier. A homepage that the user had previously used (before using this service) is determined, at step 506, and a list of one or more websites for that user is determined based on the user's preferences at step

508. In these embodiments, a particular website is selected from the combination of the list and the homepage at step 510. Information associated with the chosen website is then sent from the server to the client device, at step 512. The chosen website (or webpage) is then sent to the client to be displayed at step 514. Alternatively, the server sends redirect instructions to the client, directing the client to retrieve and display the chosen website at step 514. The client receives and displays the chosen website at step 516.

Figure 6:
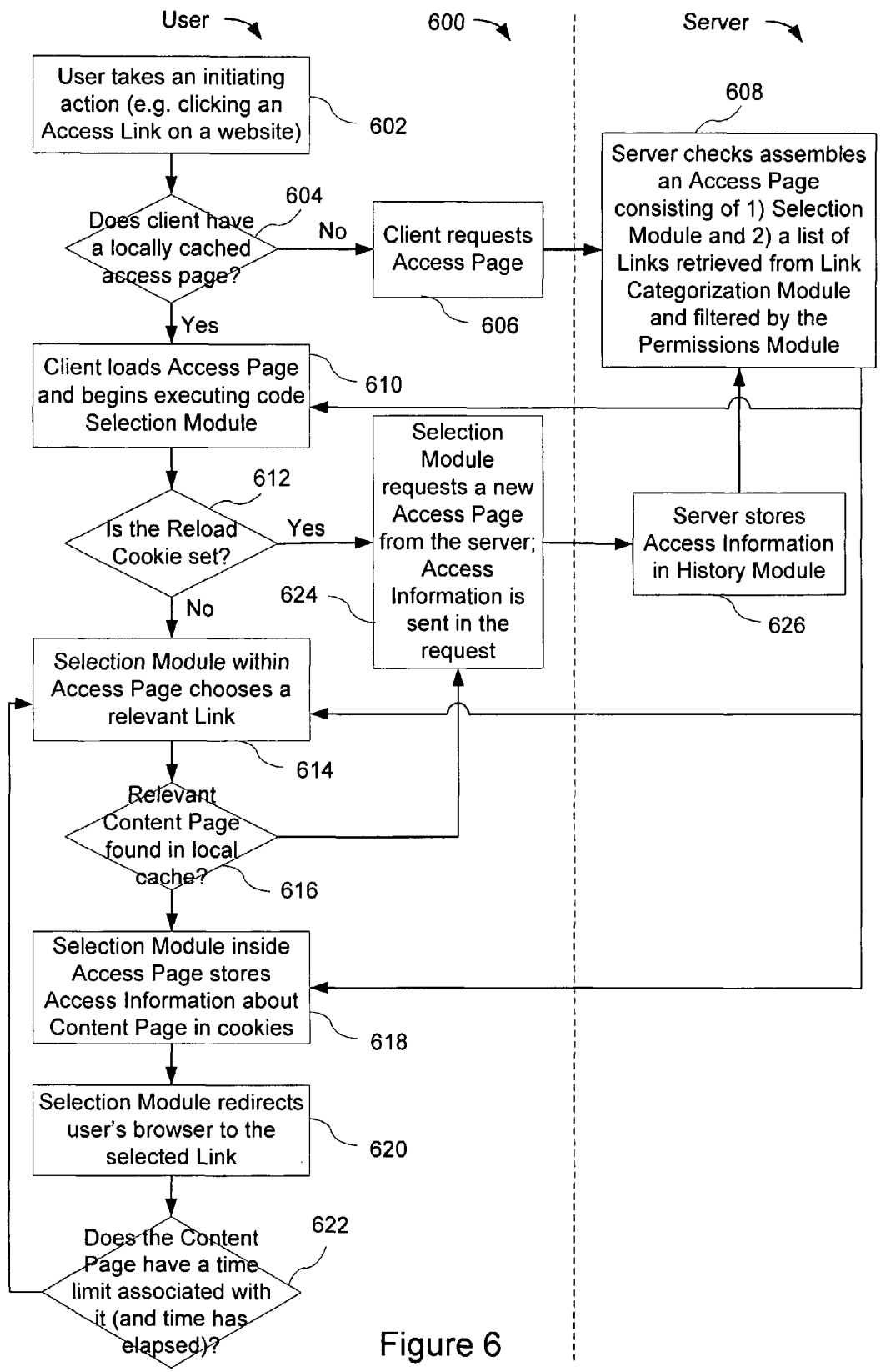
FIG. 6 is a flowchart of a process for dynamically selecting and presenting a webpage in accordance with other embodiments.

FIG. 6 is a flowchart of a process for dynamically selecting and presenting a webpage in accordance with other embodiments. The process 600 begins when a user takes an initiating action, at step 602, such as clicking an access link on a website or opening a browser. If the client does not have a locally cached access page 324 (604-No), then the client requests the access page from the dynamic webpage server 106, at step 606. This request can include a number of request parameters, such as unique identifier for the client or user (this is the UserID in the example page), an identifier representing the user's preferences for their homepage (Example "Homepage Category"), an identifier requesting a user's non-homepage categories (Example "All Categories), a request for specific link categories (Example "Specific Category or Categories"), a request for links associated with a specific user (Example "Specific User"), or a request for links associated with a specific user's category (Example "Specific User's Category). The server then generates, at step at step 608, an access page. This access page contains a selection module 330 (FIG. 3) and a list of links 332 (FIG. 3). The list of links 332 is retrieved from the link categorization module 224 (FIG. 2), which decides on a set of appropriate links based on the request parameters sent by the client. These links are filtered by the permissions module 226 (FIG. 2), either for a particular user or for public access. Examples of types of client requests for an access page is shown in Table 1.

If the client already had a locally stored cached access page (604-Yes) or once the access page is sent to the client from the server, the client loads the access page and begins executing the code of the selection module at step 610. If the reload cookie 333 (FIG. 3) is set (612-Yes), then the selection module requests a new access page from the server at step 624, which is then sent at step 608.

If the reload cookie 333 (FIG. 3) is not set (612-No), then the selection module within the access page chooses, at step 614, a relevant link from the list of links 332 (FIG. 3) previously sent to the access page by the server. If the relevant link is found in the local cache (616-Yes), then the selection module inside the access page stores access information about the link in the cookies at step 618, and the selection module re-directs the user's browser to the selected link at step 620. If the webpage associated with the chosen link has a time limit associated with it, e.g., expires after 5 minutes, (622-Yes), then the selection module selects a new link from the list at step 614 and the new webpage is retrieved by redirecting the user's browser to fetch that webpage.

Figure 8T:
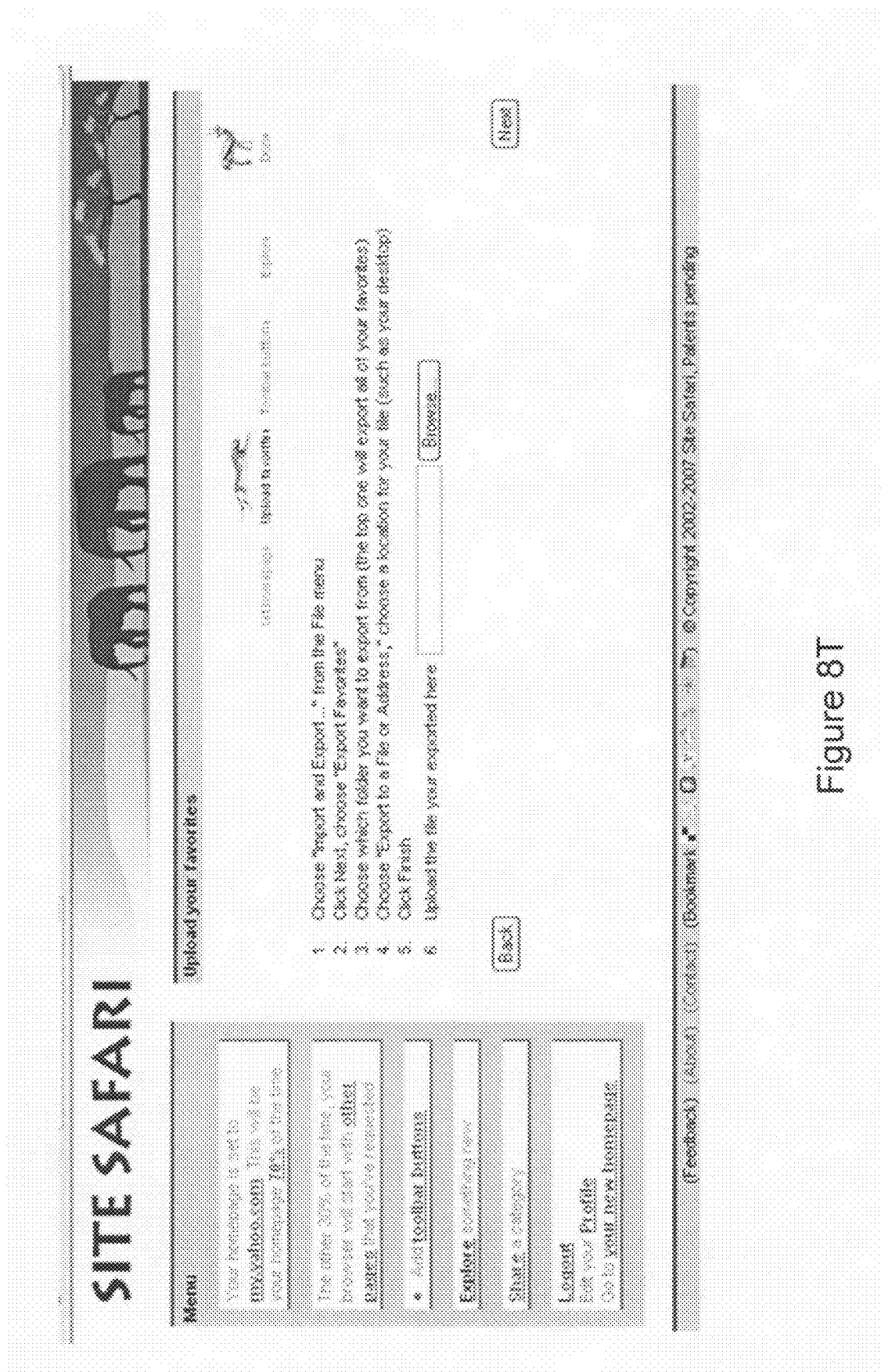

FIGS. 8A-8T are exemplary screenshots of the present system in accordance with some embodiments. As explained above, FIG. 8A is an example of a received invitation. FIG. 8B shows an exemplary initial set-up page. FIG. 8C-8T show various screenshots of the webpages that enable a user to set preferences in accordance to some embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

TABLE 1

TYPES OF CLIENT REQUESTS FOR AN ACCESS PAGE

| Example reference | Sample Request | Links included with Selection Module |
|---|---|---|
| Homepage Category | URL: http://sitesafari.com/homepage<br>Cookie value: UserID=1234<br>(user is identified by the UserID value in the cookie) | Link Categorization Module will retrieve the preferences for the links and categories that user 1234 indicated they would like to see as their homepage. Usually this includes all the categories in which the user has expressed an interest plus any links or categories that the user has specifically requested as a substitute for their homepage. The Link Categorization Module will then generate a list of Links associated with these preferences. |
| All Categories | URL: http://sitesafari.com/homepage/?imbored=1<br>Cookie value: UserID=1234 | Link Categorization Module will retrieve the preferences for the links and categories that user 1234 indicated they would like to see, exclusive of their homepage alternatives. Usually this includes all the user's categories and links of interest, but does not include pages that the user has explicitly requested as a substitute for their homepage. The Link Categorization Module will then generate a list of Links associated with these preferences |
| Specific Category or Categories | URL: http://sitesafari.com/pg/?grpid=2000, 2001,2002<br>Cookie value: UserID=1234 or omitted | Link Categorization Module will query the Permissions Module to ensure that user 1234 has permission to view link categories 2000, 2001, and 2002. It will then generate a list of Links associated with permitted categories. If the UserID is omitted, then the Permission Module will instead filter for categories that are enabled for public viewing. |
| Specific User | URL: http://user5678.sitesafari.com<br>Cookie value: UserID=1234 or omitted | Link Categorization Module will retrieve the stored preferences for user 5678 and will then query the Permissions Module to see which of those user 1234 is allowed to view. It will then generate a list of |

TABLE 1-continued

TYPES OF CLIENT REQUESTS FOR AN ACCESS PAGE

| Example reference | Sample Request | Links included with Selection Module |
|---|---|---|
| | | Links based on what is permitted. If the UserID is omitted, then the Permission Module will instead filter for categories that are enabled for public viewing. |
| Specific User's Category | URL: http://user5678.sitesafari.com/parrots Cookie value: UserID=1234 of omitted | Link Categorization Module will look within user 5678's categories for a category called "parrots". It will then check against the Permissions Module to ensure that user 1234 has permission to view links in that group. Finally, it will generate a list of Links that meet these criteria. If the UserID is omitted, then the Permission Module will filter for categories that are enabled for public viewing. |

What is claimed is:

1. A method of dynamically selecting and presenting a webpage, comprising:
at a server having one or more processors and memory storing one or more programs, the one or more processors executing the one or more programs to perform the operations of:
receiving from a browser on a client device an address of an original homepage of a user;
receiving from the browser on the client device in accordance with a user selection, an indication of how often the user would like their original homepage displayed as a homepage of the browser, where the homepage of the browser is the first website that is displayed each time that the browser is launched;
associating one or more link categories stored at the server with the user, wherein each link category is a list, stored at the server, of one or more links to webpages, and the one or more link categories include a respective link category that is generated without intervention from the user;
receiving a request from the browser on the client device to display the homepage of the browser;
in response to the request, automatically, without human interaction:
accessing a list of one or more webpages associated with the user, wherein the list is generated based on the one or more link categories associated with the user;
selecting a randomly chosen webpage from a combination of the original homepage and the list of one or more webpages, where the randomly chosen webpage is selected based on user defined preferences including how often the user would like their original homepage displayed as the homepage of the browser; and
when the randomly chosen webpage is a webpage associated with the respective link category that was generated without intervention from the user, facilitating the display of the randomly chosen webpage from the respective link category on the client device.

2. The method of claim 1, further comprising sending the randomly chosen webpage to the client device for display.

3. The method of claim 1, wherein the facilitating comprises sending instructions to the client device to obtain the randomly chosen webpage.

4. The method of claim 1, wherein the original homepage of the user is determined by the server accessing the browser on the client device without input by the user.

5. The method of claim 1, wherein the list of one or more webpages includes the bookmarks of the browser.

6. The method of claim 5, further including:
receiving a subsequent request, at the server, from the browser on the client device to again display the homepage of the browser;
automatically selecting a subsequent webpage from a combination of the homepage and the list of one or more bookmarks; and
facilitating the display of the subsequent webpage in accordance with predefined criteria.

7. The method of claim 6, wherein the list of one or more webpages includes search results from one or more search engines.

8. The method of claim 6, wherein the predefined criteria includes which websites should be displayed at particular times of the day, day of the week, or day of the year, and wherein the method further comprises, before the selecting, determining the time or date at the server.

9. The method of claim 6, wherein a sequence of subsequently displayed webpages is predetermined.

10. The method of claim 1, wherein the list of one or more webpages includes webpages associated with the interests of other users.

11. The method of claim 1, wherein receiving the indication of how often the user would like their original homepage displayed as the homepage of the browser further comprises receiving from the client device the desired frequency for displaying the homepage, wherein the display of the chosen webpage includes displaying the homepage in accordance with the frequency.

12. The method of claim 1, wherein the list of one or more webpages includes receiving a list of one or more webpages provided by the user.

13. The method of claim 12 further comprising, before the receiving step, receiving from the client device the desired frequency for displaying each of the one or more webpages, wherein the display of each of the one or more webpages includes displaying each of the one or more webpages in accordance with the frequency.

14. The method of claim 1, further comprising automatically displaying subsequent webpages from the original homepage and the list of one or more webpages in accordance with predefined criteria.

15. The method of claim 14, wherein the predefined criteria is a predetermined amount of time.

16. The method of claim 1, wherein the original homepage is not displayed each time that the browser is launched.

17. The method of claim 1, wherein the request from the client device to display the homepage of the browser is initiated by the user launching the browser on the client device.

18. The method of claim 1, wherein the request from the client device to display the homepage of the browser includes selecting the homepage of the browser.

19. A method of dynamically selecting and presenting a webpage, comprising:
at a client device having one or more processors and memory storing one or more programs, the one or more processors executing the one or more programs to perform the operations of:
sending, to a server, in accordance with a user selection by a user of a browser, an indication of how often the user would like their original homepage displayed as a homepage of the browser, where the homepage of the browser is the first website that is displayed each time that the browser is launched;
sending, to the server, information enabling the server to associate one or more link categories stored at the server with the user, wherein each link category is a list, stored at the server, of one or more links to webpages, and the one or more link categories include a respective link category that is generated without intervention from the user;
receiving, from the user, a request to open the original homepage of the browser;
in response to the request, automatically, without human interaction:
accessing, a list of one or more webpages associated with the user, wherein the list is generated based on the one or more link categories associated with the user;
selecting, a randomly chosen webpage from a combination of the original homepage and the list of one or more webpages, where the randomly chosen webpage is selected based on user defined preferences including how often the user would like the original homepage displayed as the homepage of the browser; and
when the randomly chosen webpage is a webpage associated with the respective link category that was generated without intervention from the user:
fetching the randomly chosen webpage from the respective link category; and
displaying the randomly chosen webpage.

20. The method of claim 19, further including automatically selecting a subsequent webpage after a predetermined amount of time.

21. A system for dynamically selecting and presenting a webpage, comprising:
memory;
one or more processors; and
one or more programs stored in memory and configured for execution by the one or more processors, the one or more programs comprising instructions for:
receiving from a browser on a client device an address of an original homepage of a user;
receiving from the browser on the client device in accordance with a user selection, an indication of how often the user would like their original homepage displayed as a homepage of the browser, where the homepage of the browser is the first website that is displayed each time that the browser is launched;
associating one or more link categories stored at the server with the user, wherein each link category is a list, stored at the server, of one or more links to webpages, and the one or more link categories include a respective link category that is generated without intervention from the user;
receiving a request from the browser on the client device to display the homepage of the browser;
in response to the request, automatically, without human interaction:
accessing a list of one or more webpages associated with the user, wherein the list is generated based on the one or more link categories associated with the user;
selecting, at the server and without human intervention, a randomly chosen webpage from the original homepage and the list of one or more webpages, where the randomly chosen webpage is selected based on user defined preferences including how often the user would like their original homepage displayed as the homepage of the browser; and
when the randomly chosen webpage is a webpage associated with the respective link category that was generated without intervention from the user, facilitating the display of the randomly chosen webpage from the respective link category on the client device.

22. A non-transitory computer readable storage medium for use in conjunction with a computer system having a processor, the computer readable storage medium comprising one or more programs executable by the processor, the one or more programs comprising instructions for:
receiving from a browser on a client device an address of an original homepage of a user;
receiving from the browser on the client device in accordance with a user selection, an indication of how often the user would like their original homepage displayed as a homepage of the browser, where the homepage of the browser is the first website that is displayed each time that the browser is launched;
associating one or more link categories stored at the server with the user, wherein each link category is a list, stored at the server, of one or more links to webpages, and the one or more link categories include a respective link category that is generated without intervention from the user;
receiving a request from the browser on the client device to display the homepage of the browser;
in response to the request, automatically, without human interaction:
accessing a list of one or more webpages associated with the user, wherein the list is generated based on the one or more link categories associated with the user;
selecting a randomly chosen webpage from the original homepage and the list of one or more webpages, where the randomly chosen webpage is selected based on user defined preferences including how often the user would like their original homepage displayed as the homepage of the browser; and
when the randomly chosen webpage is a webpage associated with the respective link category that was generated without intervention from the user, facilitating the display of the chosen webpage from the respective link category on the client device.

23. A system for dynamically selecting and presenting a webpage, comprising:
memory;
one or more processors; and one or more programs stored in memory and configured for execution by the one or more processors, the one or more programs comprising instructions for:

sending, to a server, in accordance with a user selection by a user of a browser, an indication of how often the user would like their original homepage displayed as a homepage of the browser, where the homepage of the browser is the first website that is displayed each time that the browser is launched;

sending, to the server, information enabling the server to associate one or more link categories stored at the server with the user, wherein each link category is a list, stored at the server, of one or more links to webpages, and the one or more link categories include a respective link category that is generated without intervention from the user;

receiving, from the user, a request to open the original homepage of the browser;

in response to the request, automatically, without human interaction:

accessing a list of one or more webpages associated with the user, wherein the list is generated based on the one or more link categories associated with the user;

selecting a randomly chosen webpage from a combination of the original homepage and the list of one or more webpages, where the randomly chosen webpage is selected based on user defined preferences including how often the user would like the original homepage displayed as the homepage of the browser; and when the randomly chosen webpage is a webpage associated with the respective link category that was generated without intervention from the user:

fetching the randomly chosen webpage from the respective link category; and displaying the randomly chosen webpage.

24. A non-transitory computer readable storage medium for use in conjunction with a computer system having a processor, the computer readable storage medium comprising one or more programs executable by the processor, the one or more programs comprising:

sending, to a server, in accordance with a user selection by a user of a browser, an indication of how often the user would like their original homepage displayed as a homepage of the browser, where the homepage of the browser is the first website that is displayed each time that the browser is launched;

sending, to the server, information enabling the server to associate one or more link categories stored at the server with the user, wherein each link category is a list, stored at the server, of one or more links to webpages, and the one or more link categories include a respective link category that is generated without intervention from the user;

receiving, from the user, a request to open the original homepage of the browser;

in response to the request, automatically, without human interaction:

accessing a list of one or more webpages associated with the user, wherein the list is generated based on the one or more link categories associated with the user;

a randomly chosen webpage from a combination of the original homepage and the list of one or more webpages, where the randomly chosen webpage is selected based on user defined preferences including how often the user would like the original homepage displayed as the homepage of the browser; and when the randomly chosen webpage is a webpage associated with the respective link category that was generated without intervention from the user:

fetching the randomly chosen webpage from the respective link category; and displaying the randomly chosen webpage.

25. The method of claim 1, wherein the original homepage and the one or more webpages are hosted on one or more web servers distinct from the server.

26. The method of claim 1 wherein the link category that is generated without intervention from the user is selected from the set consisting of: a link category created by another user; a link category managed by another user; a link category generated by a search engine based on a search query; and a link category managed by a content provider.

27. The system of claim 21, wherein the list of one or more webpages includes the bookmarks of the browser.

28. The system of claim 27, further including instructions for:

receiving a subsequent request, at the server, from the browser on the client device to again display the homepage of the browser;

automatically selecting a subsequent webpage from a combination of the homepage and the list of one or more bookmarks; and facilitating the display of the subsequent webpage in accordance with predefined criteria.

29. The system of claim 28, wherein the list of one or more webpages includes search results from one or more search engines.

30. The system of claim 28, wherein the predefined criteria includes which websites should be displayed at particular times of the day, day of the week, or day of the year, and wherein the method further comprises, before the selecting, determining the time or date at the server.

31. The system of claim 21, wherein the link category that is generated without intervention from the user is selected from the set consisting of: a link category created by another user; a link category managed by another user; a link category generated by a search engine based on a search query; and a link category managed by a content provider.

32. The computer readable storage medium of claim 22, wherein the list of one or more webpages includes the bookmarks of the browser.

33. The computer readable storage medium of claim 32, wherein the one or more programs further include instructions for:

receiving a subsequent request, at the server, from the browser on the client device to again display the homepage of the browser;

automatically selecting a subsequent webpage from a combination of the homepage and the list of one or more bookmarks; and facilitating the display of the subsequent webpage in accordance with predefined criteria.

34. The computer readable storage medium of claim 33, wherein the list of one or more webpages includes search results from one or more search engines.

35. The computer readable storage medium of claim 33, wherein the predefined criteria includes which websites should be displayed at particular times of the day, day of the week, or day of the year, and wherein the method further comprises, before the selecting, determining the time or date at the server.

36. The computer readable storage medium of claim 22, wherein the link category that is generated without intervention from the user is selected from the set consisting of: a link category created by another user; a link category managed by another user; a link category generated by a search engine based on a search query; and a link category managed by a content provider.

* * * * *